(12) United States Patent
Vedurumudi et al.

(10) Patent No.: US 10,963,361 B2
(45) Date of Patent: Mar. 30, 2021

(54) OVERLAPPING-IN-TIME EXECUTION OF LOAD TESTS ON APPLICATIONS IN A CENTRALIZED SYSTEM

(71) Applicant: Oracle International Corporation, Redwood Shores, CA (US)

(72) Inventors: Prasad V V Vedurumudi, Bangalore (IN); Praveen Morusupalli, Frisco, TX (US); Nirguna Kota, Dublin, CA (US); Vinay Beerakayala, Hyderabad (IN); Arun Balakrishna, Hassan (IN)

(73) Assignee: Oracle International Corporation, Redwood Shores, CA (US)

(*) Notice: Subject to any disclaimer, the term of this patent is extended or adjusted under 35 U.S.C. 154(b) by 32 days.

(21) Appl. No.: 16/564,627

(22) Filed: Sep. 9, 2019

(65) Prior Publication Data

US 2020/0034267 A1    Jan. 30, 2020

Related U.S. Application Data

(63) Continuation of application No. 15/664,917, filed on Jul. 31, 2017, now Pat. No. 10,445,207.

(51) Int. Cl.
| | |
|---|---|
| *G06F 11/34* | (2006.01) |
| *H04L 12/26* | (2006.01) |
| *G06F 11/30* | (2006.01) |
| *H04L 12/24* | (2006.01) |
| *H04L 29/06* | (2006.01) |

(52) U.S. Cl.
CPC ........ *G06F 11/3433* (2013.01); *G06F 11/302* (2013.01); *G06F 11/3006* (2013.01); *G06F 11/3414* (2013.01); *G06F 11/3452* (2013.01); *H04L 41/5038* (2013.01); *H04L 43/04* (2013.01); *H04L 43/50* (2013.01); *G06F 2201/805* (2013.01); *H04L 67/42* (2013.01)

(58) Field of Classification Search
None
See application file for complete search history.

(56) References Cited

U.S. PATENT DOCUMENTS

| | | |
|---|---|---|
| 6,418,544 B1 | 7/2002 | Nesbitt |
| 7,100,195 B1 | 8/2006 | Underwood |
| 10,135,709 B1 | 11/2018 | Segel |
| 10,191,778 B1 | 1/2019 | Yang |
| 2004/0015722 A1 | 1/2004 | Klotz |
| 2013/0124610 A1 | 5/2013 | Smith |

(Continued)

*Primary Examiner* — Brian Whipple
(74) *Attorney, Agent, or Firm* — Trellis IP Law Group, PC

(57) ABSTRACT

User specified build jobs are received at a centralized system. Each of the build jobs includes the load jobs for applications to execute in the centralized system. Clients and servers are created on selected hardware hosts based on the build jobs. Each of the selected hardware hosts includes one of the clients and a subset of the servers. Each of the clients and each of the servers resides in a separate container of a plurality of containers. Each of the clients and each of the servers use mutually exclusive subsets of hardware resources provided by the containers and obtain non-emulated operating system assistance. Overlapping-in-time load tests are executed on the applications. Real time performance information is collected during the executing of the load tests of the applications. After completion of a subset of the load tests, a subset of the selected hardware hosts is made available for executing subsequent load tests by removing containers.

20 Claims, 13 Drawing Sheets

(56) References Cited

U.S. PATENT DOCUMENTS

2018/0006910 A1 1/2018 Yin
2018/0067780 A1 3/2018 Noda
2018/0176097 A1 6/2018 Russell

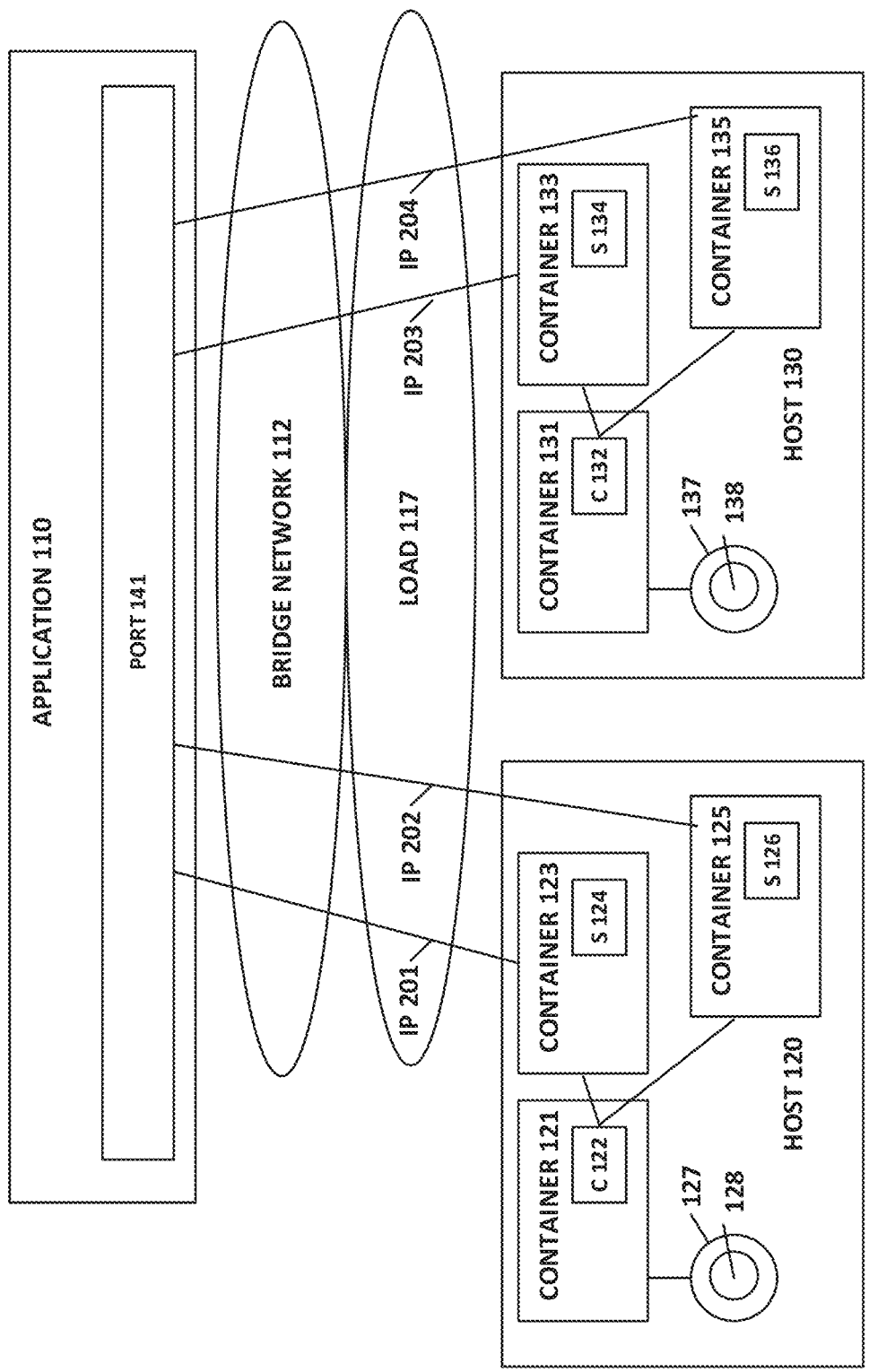

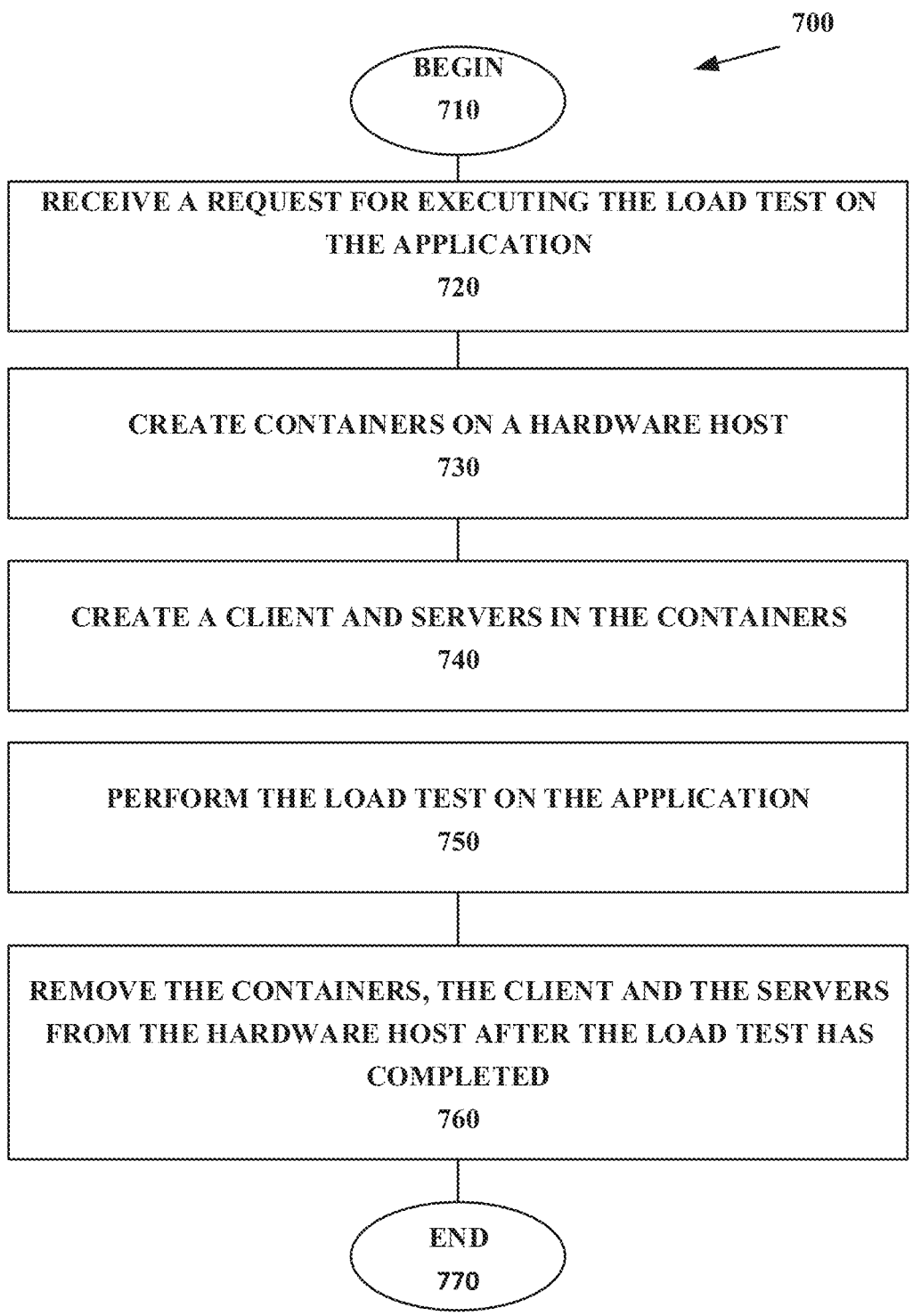

OVERLAPPING-IN-TIME EXECUTION OF LOAD TESTS ON APPLICATIONS IN A CENTRALIZED SYSTEM

CROSS REFERENCES TO RELATED APPLICATIONS

This application is a continuation of the following application, U.S. patent application Ser. No. 15/664,917, entitled SYSTEM AND METHOD TO EXECUTE AND MANAGE LOAD TESTS USING CONTAINERS, filed on Jul. 31, 2017 which is hereby incorporated by reference as if set forth in full in this application for all purposes.

BACKGROUND

Performing a load test on an application involves potentially multiple clients and servers communicating with the application in order to stress the performance of the application. If the application is a user interface, the clients and servers may simulate user interface communications with the application. If the application is a web server, the clients and servers may communicate with web services interfaces, such as Representational State Transfer (REST) Application Program Interfaces (APIs), provided by the application.

Traditionally, load testing setup has been a cumbersome procedure with complicated setups needed to execute loads. One method for solving this problem has been to use virtual machines (VMs). However, setup and cleanup maintenance activities are required for virtual machines. The setup and maintenance of the virtual machines is expensive and time consuming. Further, remnants from prior executions of load tests may remain in the virtual machines. Therefore, there is no assurance that the virtual machines will start in a clean state.

SUMMARY

Various embodiments provide for performing a load test on an application. In one embodiment, a request is received for executing the load test on the application. The request includes a script and a property file. In response to the request, containers are created on a hardware host. Each of the containers isolate mutually exclusive subsets of hardware resources of the hardware host based on namespaces. A client and a plurality of servers are created in the containers. Only one of the client or the servers reside in each of the containers. The client and the servers are designated to communicate with the application. The load test is performed on the application while each of the client and the servers use the subset of the hardware resources isolated by a respective namespace. The property file is input to the script and the script instructs the client on how to control execution of the load test by the servers. The containers, the client and the servers are removed from the hardware host after the load test has completed. Containers with associated client and servers are created and removed each time a load test is performed One embodiment provides for a tangible processor-readable storage device including instructions for a method of performing a load test on an application, wherein the tangible processor-readable storage device includes instructions executable by one or more processors for: performing a load test on an application, wherein the tangible processor-readable storage device includes instructions executable by one or more processors for: receiving a request for executing the load test on the application, wherein the request includes a script and a property file, includes information specifying a number of hardware hosts, information specifying a number of servers to spawn, information specifying which of the hardware hosts to create the servers for the load test; and in response to the request, creating containers on a hardware host based on the information specifying the hardware host and the information specifying number of servers to spawn, wherein each of the containers isolate mutually exclusive subsets of hardware resources of the hardware host based on namespaces; creating a client and a plurality of servers in the containers based on the information specifying the number of servers to spawn, wherein only one of the client or the servers reside in each of the containers, wherein the client and the servers are designated to communicate with the application; performing the load test on the application while each of the client and the servers use the subset of the hardware resources isolated by a respective namespace, wherein the property file is input to the script and the script instructs the client on how to control execution of the load test by the servers; and removing the containers, the client and the servers from the hardware host after the load test has completed, wherein containers with associated client and servers are created and removed each time a load test is performed.

A further understanding of the nature and the advantages of particular embodiments disclosed herein may be realized by reference of the remaining portions of the specification and the attached drawings.

BRIEF DESCRIPTION OF THE DRAWINGS

FIG. 2A depicts a block diagram of the application with respect to hosts, according to one embodiment.

FIG. 7 depicts a flowchart for a method of automatically performing a load test on an application, according to one embodiment.

DETAILED DESCRIPTION OF EMBODIMENTS

Overview of Discussion

In one embodiment, each of a group of clients and servers to be used in a load test are contained in a portable, self-sufficient container that has a high level of independence from of hardware, language, framework, packaging system, hosting provider and other specific platform or environment characteristics. Although reference is made to a specific container type such as a "docker container,"—an open source project described, for example, at www.docker.com—other independent container types may be used. Unlike virtual machines which emulate hardware resources, the docker containers partition the actual hardware resources, such as the CPU, memory, groups of CPUs, and so on, of one or more hardware hosts that the clients and servers execute on. In other words, mutually exclusive subsets of the host's hardware resources are designated for each docker container.

The clients and servers can be quickly created in their respective docker containers by creating an instance of a docker client image or a docker server image (referred to as "docker images"). Other embodiments can use other types of independent images. According to one embodiment, the docker containers are used with distributed JMeter™ setup in the docker images, thus, providing non-proprietary industry standardized modeling for the load test.

JMeter™ by APACHE® provides quick installations. For example, docker containers and their respective client or servers can be created in one or more hosts using JMeter™ installation in a matter of seconds. JMeter™ uses Remote Method Invocation (RMI) communications between a client and its associated servers. Docker containers enable the use of RMI between the clients and servers that reside in the docker containers, thus, enabling the use of JMeter™. Further, the docker containers and their respective client or server can be removed after each execution of a load test assuring that each load test starts in a clean state.

In contrast to the quick installation provided by JMeter™, spawning VMs instead of the containers would require several minutes. Thus, various embodiments provide for quickly and continuously executing load tests in succession. For example, various embodiments provide for quickly and continuously creating clients, servers and their associated containers, executing a load test against an application using those clients and servers, and removing the containers with their associated clients and servers so that new clients, servers and their containers can be created and executed for a subsequent load test.

An Exemplary System

Figure 1:
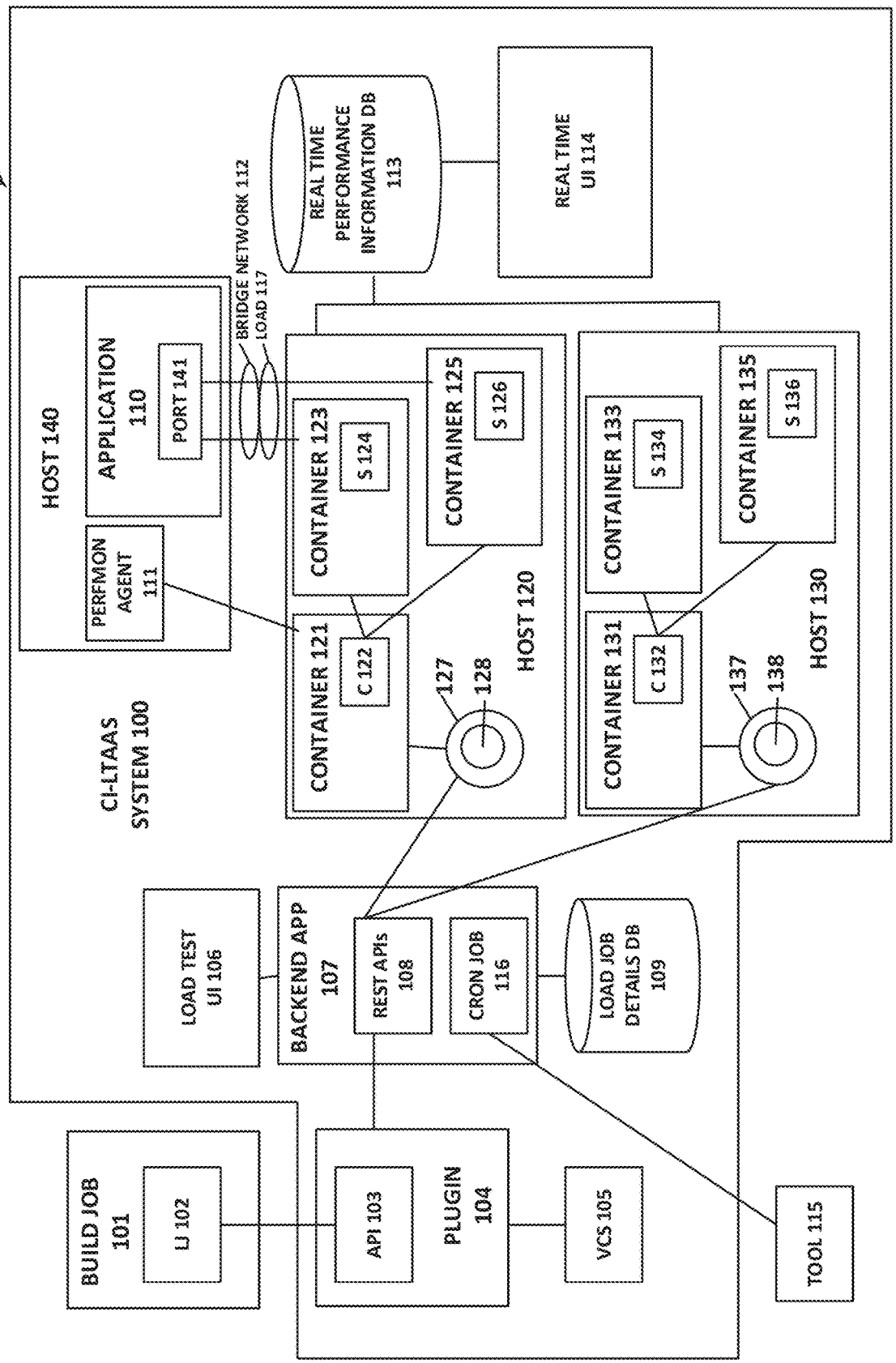
FIG. 1 depicts a block diagram of a system 10 for automatically performing a load test on an application, according to one embodiment.

FIG. 1 depicts a block diagram of a system 10 for automatically performing a load test on an application, according to one embodiment.

As depicted in FIG. 1, the system 10 includes a continuous integration load testing as a service (CI-LTaaS) system 100. According to one embodiment, the CI-LTaaS system 100 is a NodeJS® based application which manages job submission, job execution and generating reports from the final JMeter™ results. The system 10 also includes a build job 101, an application 110 executing on a host 140, and a command line tool 115. According to one embodiment, the command line tool is a CMD runner JMeter tool. The port 141 is the host port 141 for the host 140 that the application 110 executes on.

The CI-LTaaS system 100 includes a plugin 104, a version control system 105, a load test user interface (UI) 106, a backend application 107, a load job details database (DB) 109, a performance monitoring agent 111 (also referred to as "perfmon agent"), hosts 120 and 130, a real time performance information database 113, and a real time user interface 114. The hosts 120 and 130 are not virtual machines. They are real hardware computer systems.

The build job 101 includes a load job 102. The plugin 104 provides an application program interface (API) 103 for calling the plugin 104. The backend application 107 provides several REST APIs 108 and a cron job 116. Each of the hosts 120 and 130 include a client 122, 132 and multiple servers 124, 126, 134, 136, that each reside in their own respective containers 121, 123, 125, 131, 133, 135, REST APIs 127, 137 and a demean 128, 138. More specifically, host 120 includes client 122, servers 124, 126, containers 121, 123, 125, REST APIs 127 and demean 128. Host 130 includes client 132, servers 134, 136, containers 131, 133, 135, REST APIs 137 and demean 138. According to one embodiment, a host includes one client and multiple servers that the client communicates with. The application 110 can be implemented on one or more server devices and one or more databases.

Container 121 includes client 122, Container 123 includes server 124, container 125 includes server 126, container 131 includes client 132, container 133 includes server 134, and container 135 includes server 136. The containers, according to one embodiment, are docker containers and each of the docker containers are defined by a namespace that isolates a subset of hardware resources of the host. Examples of hardware resources that can be isolated using namespaces include central processing unit (CPU), memory, block input/output (I/O), network, etc. The client or server in a container shall use the subset of hardware resources isolated in the namespace associated with that container without using the hardware resources isolated by another namespace associated with another container. Each of the containers contain one of the clients or one of the servers. Since the containers 121, 13, 125, 131, 133, 135 isolate a client or a server and respective subsets of hardware, they are referred to as independent containers. For example, independent container 121 isolates client 122 and a first subset of hardware from the server 124 and a second set of hardware of independent container 123 and vice versa.

According to one embodiment, none of the clients or servers are contained directly or indirectly by any virtual machines. The clients and the servers obtain operating system assistance from a real operating system without intervention of any virtual machines. The phrase "real operating system" means an operating system that provides services with respect to the hardware of a host instead of emulating hardware. Virtual machines and virtual operating systems that emulate hardware are well known in the art.

The load job 102 calls the plugin 104's API 103. The plugin 104 communicates with the REST APIs 108 of the backend application 107. The backend application 107 communicates with the load test user interface 106 and the load job details database 109. The backend application 107's REST APIs 108 communicate with the respective REST APIs 127, 137 associated with the hosts 120, 130. The REST APIs 127, 137 communicate with respective clients 122, 132 and are used for spawning the clients and the servers on the hosts 120, 130, as discussed herein. The performance monitoring agent 111 communicates with the clients 122 and 132. The clients 122, 132 communicate with the servers 124, 126, 134, 136 in their respective hosts 120, 130. The clients 122 and 132 control their respective servers 124, 126, 134, 136, for example, by instructing the servers on what tests to run and how to run them based on the a script and property file, as discussed herein. The servers 124, 126, 134, 136 communicate with the application 110 over separate internet protocol addresses and also communicate with the real time performance information database 113. The real time performance information database 113 communicates with the real time user interface 114.

The build job 101 starts the application 110 and the load job 102. The load job 102 invokes the API 103 of the plugin 104. The API 103 simplifies starting and managing the load test by providing a defined interface. The plugin 104 communicates with the backend application 107. Information associated with data structures used by the plugin 104 can be persistently stored in a version control system (VCS) 105, as discussed herein. According to one embodiment, the VCS 105 is a GIT system. The backend application 107 in combination with the daemons 128, 138 and associated REST APIs 127, 137 create the containers 121, 123, 125, 131, 133, 135, the clients 122, 132 and the servers 124, 126, 134, 136. The load job 102 causes a load 117 to be executed against the application 110. The client container 121, 131 and the server containers 123, 133, 125, 135 execute the load 117 against the application 110. The clients 122 and 132 control their respective servers 124, 126, 134, 136, for example, by instructing the servers on what tests to run and how to run them based on the a script and property file, as discussed herein. The communications between the servers 124, 126, 134, 136 and the application 110 create the load 117 on the application 110. The backend application 107 manages the load job 102 and monitors the results in the database 109. The backend application 107 uses various REST APIs 108 as part of managing the load job 102 and monitoring the results of the load 117. Details about the load job 102 are stored in the load job details database 109. For example, the load job details DB 109 is updated to reflect which containers are crated on which hardware hosts for a particular load job. Real time performance information is gathered and stored in the database 113 which can be viewed while the load 117 is being performed. Post test load performance information is also collected and can be viewed via the load test user interface 106. The containers 121, 123, 125, 131, 133, 135 are removed from the hosts 120 and 130 after the load job 102 completes. Various components of the system 10 are discussed in more detail hereinafter.

FIG. 2A depicts a block diagram of the application 110 and the hosts 120, 130 with the internet protocol addresses and bridge network, according to one embodiment. As depicted, each server 124, 126, 134, 136 communicates with the application 110 over a separate internet protocol address 201, 202, 203, 204. For example, server 124 communicates with the application 110 using internet protocol address 201; server 126 communicates with the application 110 using internet protocol address 202; server 134 communicates with the application 110 over internet protocol address 203; and server 136 communicates with the application 110 over internet protocol address 204. The servers 124, 126, 134, 136 communicate with the application 110 via the host port 141 using their respective internet protocol addresses 201-204.

According to one embodiment, the CI-LTaaS system 100 is a centralized system that various organizations can use simultaneously to execute load tests against their respective applications. Examples of organizations include at least departments, companies, and teams. The teams can be within or across departments of the same or different companies, among other things. These organizations can request to execute a load test with a build job and an associated load job. Two organizations can submit their own respective build jobs simultaneously, for example, to load test their respective applications. Further, any organization can submit build jobs repeatedly in quick succession to load test, for example, different versions of the same application. An application will be installed, one or more hosts will be provisioned and containers with clients and servers will be created on the hosts in compliance with the respective build jobs and load jobs.

Figure 2B:
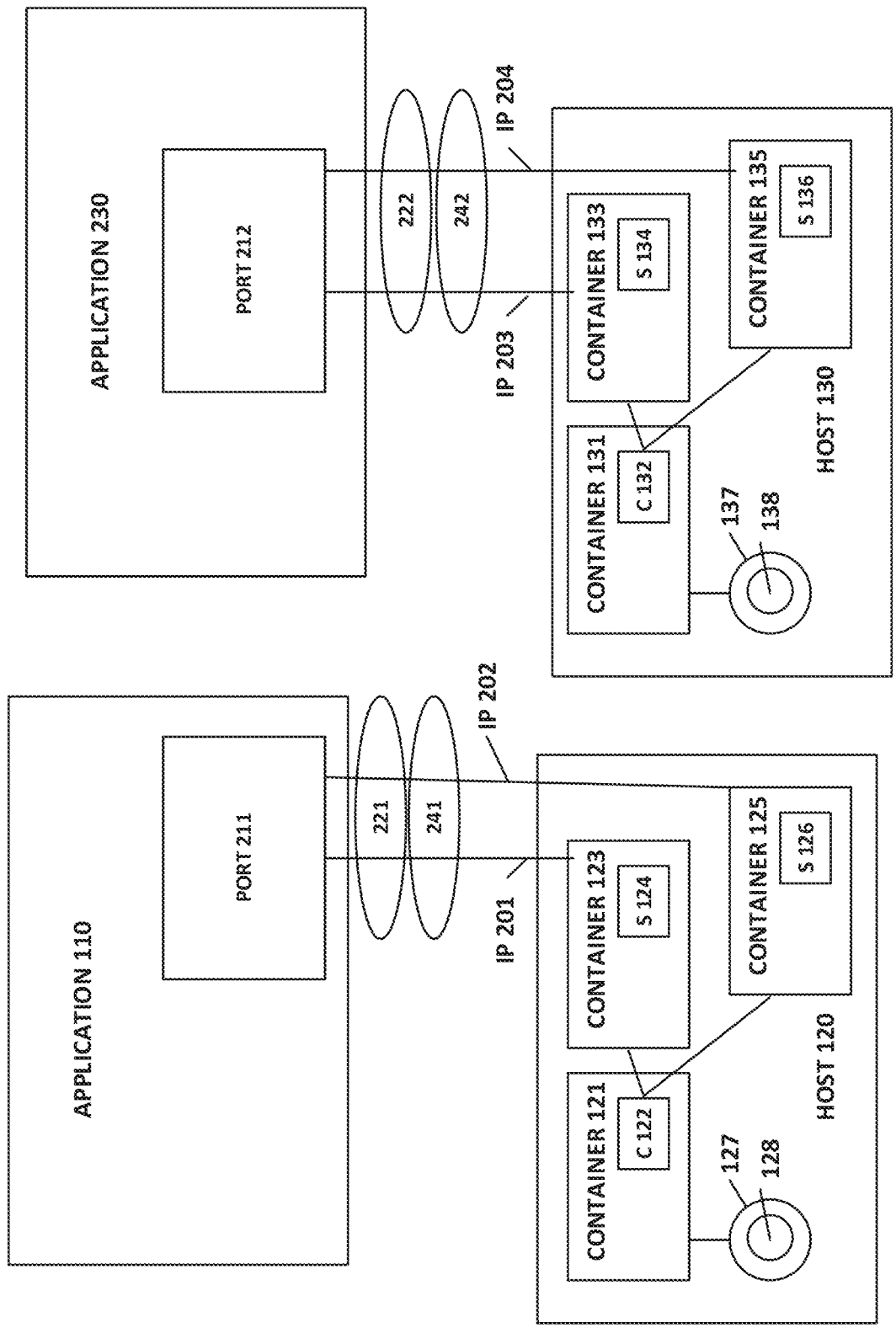
FIG. 2B depicts a block diagram of the hosts with respect to two applications, according to one embodiment.

FIG. 2B depicts a block diagram of the hosts with respect to two applications, according to one embodiment. The two applications can be for the same or for separate organizations as discussed herein.

Referring to FIGS. 1 and 2B, the first application 110 provides a port 211 and the second application 230 provides a port 212. The first host 120 has been assigned to execute a first load 214 against the first application 110 and the second host 130 has been assigned to execute a different load 242 against the second application 230. Therefore, the servers 124 and 126 for host 120 communicate via their respective internet protocol addresses 201, 202 with the port 211 for the first application 110 while servers 134 and 136 for the second host 130 communicate via their respective internet protocol addresses 203, 204 with the port 212 for the second application 230.

Various components of system 10 are discussed in more detail hereinafter.

Docker Containers

Unlike virtual machines, which emulate hardware resources, the docker containers isolate the actual hardware resources, such as the CPU, memory, groups of CPUs, and so on, of one or more hardware hosts that the clients and servers execute on. In other words, mutually exclusive subsets of the host's hardware resources are isolated by each docker container.

A docker container, or other independent container, unlike a virtual machine, does not require or include a separate operating system. Instead, docker containers rely on the kernel's functionality of the real operating system and use resource isolation of the hardware resources, such as CPU, memory, block I/O, network, etc., and separate namespaces to isolate the client's and servers' views of the real operating system.

A container wrap-up software, such as a client or a server, in a self-contained filesystem and that includes everything the client or server needs to run independently, such as binaries, runtime libraries, system tools, system packages, etc. This level of simplification and compartmentalization allows the clients and the servers to be spun up into one or more hosts much more quickly than creating a virtual machine on a host while ensuring the amount of time to build the clients and servers and ensuring a consistent and predictive start.

Build Job

According to one embodiment, referring to FIG. 1, the build job 101 is a Jenkins build job and it includes a load job 102. According to one embodiment, there is a build job for each load job. For example, a system is built and then a load test is run against the built system.

Build Job 101 builds the application 110 to be tested, installs the application 110 on a host 140 and brings up the application 110 and then uses the plugin 104 to spawn the load job. The CI-LTaaS system 100 selects which hosts 120, 130 to spawn the containers 121, 123, 125, 131, 133, 135 on for the load job. The mode in which the build job 101 builds the application 110 and installs it can be done in many ways. For example, the build job 101 can use a master-slave mechanism where it can pass on an install job to the slave to install and bring up the application on that slave. According to one embodiment, the build job 101 would upload an application installable binary to an "artifactory" and the slave would download the binary from the "artifactory" and install the application on a host 140.

Figure 3:
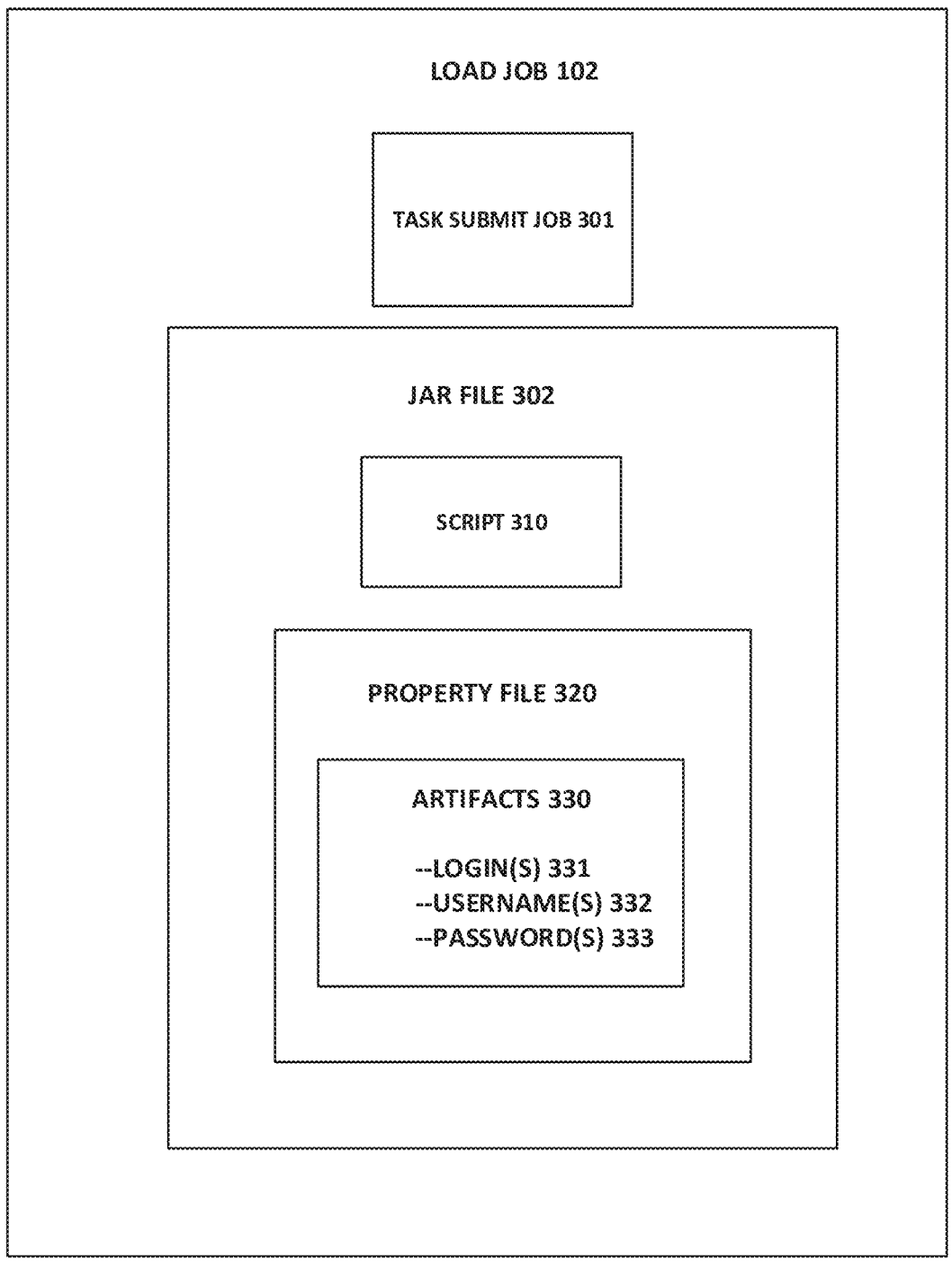
FIG. 3 depicts a block diagram of the load job, according to one embodiment.

FIG. 3 depicts a block diagram of the load job 102, according to one embodiment. The load job 102 includes a task submit job 301, and a JAR file 302. The JAR file 302 includes a script 310, and a property file 320. The script 310 can be a JMeter™ script. The script 310 can specify, for example, what operations the servers are to execute against the application, including the types of calls to make, and the sequence for executing those operations, how many times to execute the specified operations, how many parallel threads to execute against the application.

The property file 320 includes artifacts 330. The artifacts 330 includes one or more logins 331, one or more usernames 332, and one or more passwords 333 for communicating with and/or accessing the application 110 as part of the load 117. For example, the artifacts can be used to specify that there will be parallel threads simulating 5 different users interacting with the application 110 (FIG. 1). For example, thread one is for logging in as user "John," and thread two is for logging in as "Steve." The property file can specify the host port 141 for the host 140 that the application 110 is executing on, as shown in FIG. 1. The script can be in a JMX file.

Referring to FIG. 1, the clients 122 and 132 control their respective servers 124, 126, 134, 136, for example, by instructing the servers 124, 126, 134, 136 on what tests to run and how to run them based on the a script and property file, as discussed herein.

Hosts

Referring to FIG. 1, the CI-LTaaS system 100 includes the hosts 120, 130 that create the load 117 against the application 110. Each load job 102 includes logic for spawning a client 122 in one container 121 and a plurality of servers 124, 126 where each one of the servers 124, 126 are in their own respective container 123, 125. According to one embodiment, the clients are JMeter™ clients and the servers are JMeter™ servers. According to one embodiment, the containers are docker containers and the images that the clients 122, 132 and servers 124, 126, 134, 136 are spawned from are docker images.

There will be two images created for this purpose. One of the images is for the client 122 and the other image is of a server 124, 126. According to one embodiment, the clients 122, 132 are instances of a docker client image and the servers 124, 126, 134, 136 are instances of the docker server image. The docker client image and the docker server image are examples of independent images because they independent of each other and copies of them in the form of a client or server can be executed in independent containers, as discussed herein.

The daemon 128, 138 are configured on all the hosts 120, 130 so that the lifecycle of the containers 121, 123, 125, 131, 133, 135 can be managed using the REST APIs 127, 137 associated with the daemons 128, 138. According to one embodiment, the daemons 128, 138 are configured according to standard Docker™ configuration. For example, the option "-H tcp://0.0.0.0:5555" defined in the file indicates to docker service when the host 120, 130 starts it to bring up the daemon on port 5555. The load job 101 specifies how many hosts 120, 130 to use and how many containers to spawn. The CI-LTaaS system 100 selects which host to spawn containers on from a pool of machines that it manages. Daemons are preconfigured on each of the machines in the pool that the system manages. When a machine is added to the pool, the daemon is already configured. The docker service manages the daemon and brings it up whenever the service comes up on the host.

Examples of phases of the container lifecycle are bringing up a container, spawning the clients/servers onto the containers, stopping the container after the load job 102 completes, and removing the container from the host after the container has been stopped. According to one embodiment, the daemons are docker daemons and the REST APIs are docker REST APIs.

Application

Referring to FIG. 1, the application 110 can be any type of application that a load test may be performed on. In one example, the application 110 may be a user interface application that is driven with calls to it. In another example, the containers 121, 123, 125 of a host 120 may simulate the communications to the application 110 that would result from a user interacting with the application 110. In another example, the application 110 may be a web service. In this case, the containers 121, 123, 125 of a host 120 may would communicate with the web services or REST APIs exposed by the application 110. These are just a couple of examples of the type of application 110 that various embodiments can be used to perform the load 117 for the load job 102.

Perfmon Agent

Referring to FIG. 1, a perfmon agent 111 is configured on the servers 140 running the application 110 so that JMeter™ client 122 running in container 121 can gather the server metrics, such as CPU, I/O, Network etc., from the servers 124, 126 while the load job 102 performs the load 117. The perfmon agent 111, according to one embodiment, is a JMeter™ perfmon agent.

The Plugin and the Version Control System

Referring to FIG. 1, the plugin 104, according to one embodiment, is a custom Gradle plugin written in groovy which provides easy to use Gradle Tasks for submitting a load job 102, monitoring a load job 102 and fetching result files. According to one embodiment, APACHE®'s Gradle is used for the plugin 104. The plugin 104 communicates with the REST APIs 108 exposed by backend application 107, thus, hiding complexity from the developer using the plugin 104. For example, a developer could start a load job 102 simply by providing a few parameters via the task submit job 301 (FIG. 3) and calling the plugin API 103, as discussed herein.

Figure 4:
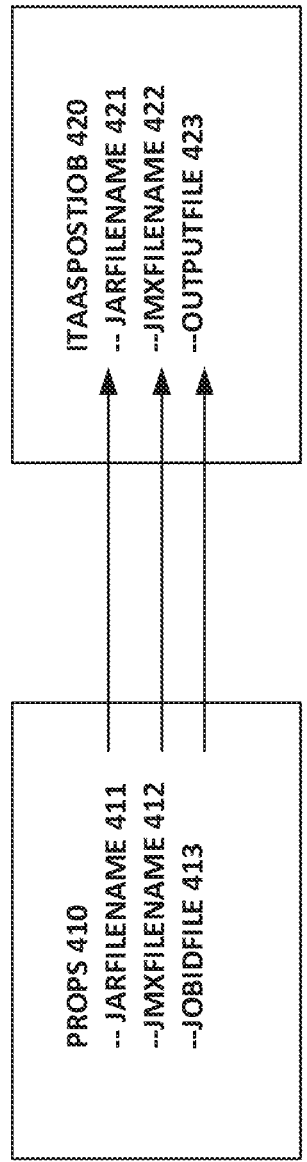
FIG. 4 depicts pseudocode and two data structures that are used by the task submit job, according to one embodiment.

FIG. 4 depicts pseudocode 400 and two data structures 410, 420 (FIG. 4) that are used by the task submit job 301 (FIG. 3), according to one embodiment.

The props data structure 410 includes variables for jarfile name 411, jmxfile name 412, and jobidfile 413. The ITaasPostJob data structure 420 includes variables for jobfilename 421, jmxfilename 422 and outputfile 423.

The pseudocode 400 provides instructions 401-404. According to one embodiment, the plugin 104 is a Maven™ published plugin. Therefore, APACHE® Maven™ coordinates are used for locating it in a Maven™ repository. Therefore, instruction 401 provides the Maven™ coordinates of the plugin 104. Instruction 402 reads properties into the props data structure 410 causing values to be set in the variables 411, 412, 413.

Figure 5A:
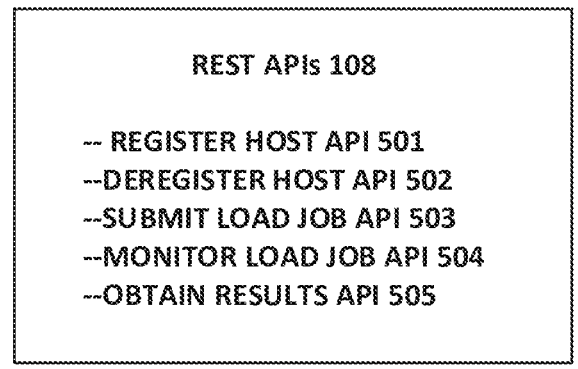
FIG. 5A depicts a block diagram of the REST APIs of the backend application, according to one embodiment.

Instruction 403 moves the values of the props data structure 410 to the ITaasPostJob data structure 420. For example, jobfilename 421 is set to the value of jarfilename 411; jmxfilename 422 is set to the value of jmxfilename 412, and outputfile 423 is set to the value of jobidfile 413. The ITaasPostJob data structure 420 is an object that will be consumed by the CI-LTaaS API 103 (FIG. 1). At instruction 404, the CI-LTaaS API 103 is called and the data structure 420 is passed to the API 103. The task submit job 301 (FIG. 3) can also monitor the load job for example by calling a monitor job API 504 (FIG. 5A) and fetch the results by calling an obtain results API 505 (FIG. 5A).

According to one embodiment, referring to FIGS. 1 and 3, the plugin 104 controls the execution and monitors load jobs in CI-LTaaS system 100. The plugin 104 is a wrapper on top of the REST APIs 108 provided by the system 100. The plugin 104 provides an easy to use interface where the end user creates a property file 320 (FIG. 3) with parameters for the target host 120, 130 that will generate the load 117. The plugin 104 also provides the appropriate scripts 310 (FIG. 3) which consume the property files 310 (FIG. 3). The plugin 104 packages the property files 320 and the scripts 310 and submits jobs to CI-LTaaS system with a single API call as depicted at instruction 404. According to one embodiment, the plugin 104 is a Gradle plugin which makes it easy for customers to extend their test frameworks to submit load jobs 102 to the system 100.

Thus, referring to FIGS. 1 and 4, the API 103 simplifies starting and managing the load test by providing a defined interface, for example, with the data structures 410, 420 and the pseudocode 400 for invoking the API 103. Further, according to one embodiment, the load job 102 is typically used to communicate the types of information that vary between load jobs, for example, in the form of the script and artifacts.

Finally, plugin 104 (FIG. 1) also provides an API to fetch the complete JTL result file generated by the load test. The end user has a choice to use their own custom report generators that can generate custom reports based on the JTL result file. The user does not have to perform any of the result generations if they choose to use the standard JMeter reports that are generated by the CI-LTaaS system 100 automatically at the end of each run. These standard JMeter reports can be viewed via the page 605 (FIG. 6A), as discussed herein.

Information in data structures 410 and 420 (FIG. 4) can be persistently stored in a version control system (VCS) 105 (FIG. 1), such as GIT™. The load job 102, or a subset thereof, may be stored in the VCS 105.

The Backend Application

Referring to FIGS. 1 and 5A, the load job 102 is managed by the backend application 107. According to one embodiment, the backend application 107 is written in NodeJS®. This backend application 107 basically exposes various REST APIs 108, as depicted in FIG. 5A.

FIG. 5A depicts a block diagram of the REST APIs 108 of the backend application 107, according to one embodiment. The REST APIs 108 (FIG. 1) include a register host API 501, a deregister host API 502, a submit load job API 503, a monitor load job API 504, and an obtain results API 505.

The register a host API 501 can be used for registering a host 120, 130 with the system 100.

The deregister a host API 502 can be used for deregstering a host 120, 130 from the system 100.

Referring to FIGS. 1, 3 and 5A, the submit load job API 503 submits a load job. The input to this REST API is a jar file 302 where the JMeter™ script 310 (FIG. 3) and the related artifacts 330 are packaged in the jar file 302. The script 310 is a JMeter™ script, according to one embodiment, and can be in a JMX file. This API 503 would save the jar file 302 (FIG. 3) on a disk in a folder created to manage the job related artifacts 330 (FIG. 3) and creates an entry in the jobs table 512 with status of the load job 102 as "submitted."

Figure 5B:
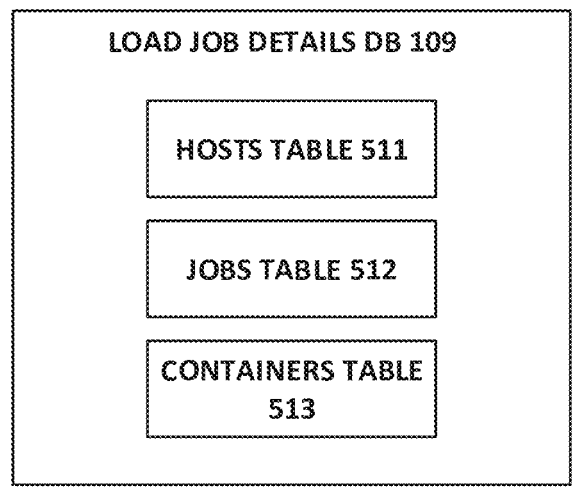
FIG. 5B depicts a block diagram of the load job details database, according to one embodiment.

Referring to FIGS. 1, 3 and 5B, the cron job 116 checks the job table 512 (FIG. 5B) frequently for any submitted entries. The cron Job 116 selects a host, such as 120 or 130, to execute the load job 102 on and spawns the client and server containers 121, 123, 125 using REST APIs 127, 137 for the daemon 128, 138. The load job 101102 specifies the number of servers 124, 126, 134, 136 to spawn, the number of hosts 120, 130, on which hosts 120, 130 for that particular load job 101. The file containing the script 310 and related artifacts 330 are then passed on to the client 122. The client 122 interacts with the servers 124, 126 and executes the load 117. Once the load 117 is started, it is set to "In Progress" status in the jobs table 512 (FIG. 5B). The cron job 116 also checks if any of the currently executing load jobs 102 have completed. On completion, it 116 gathers the JTL result file from the client 122 along with any pertinent logs from client and server containers 121, 123, 125. It 116 then deletes the containers 121, 123, 125 and marks the job 102 as completed in the jobs table 512 (FIG. 5B). It also generates all standard charts for the completed run. The cron job 116 uses the command line tool 115 to generate all the standard charts for the load 117.

Referring to FIGS. 1 and 5A, the monitor load job API 504 can be used for monitoring the load job 102. This API 504 returns current status of a job 102 given its identifier (ID).

Referring to FIGS. 1 and 5A, the obtain results API 505 can be used for fetching results files(s). For completed load jobs 102, this API 505 can be used to download the result JTL file from one or more appropriate clients 122, 132 via the cron job 116, as discussed herein.

Load Job Details Database

Referring to FIG. 1, the details for a load job 102 are stored in the load job details database 109. According to one embodiment, the database 109 is a MongoDB®. There are 3 primary types of data that are collected in the database 109. For the sake of simplicity, each of the three types of collected data shall be referred to as tables.

FIG. 5B depicts a block diagram of the load job details database 109 (FIG. 1), according to one embodiment. As depicted, the database 109 includes a hosts table 511, a jobs table 512 and a container table 513.

Referring to FIGS. 1 and 5B, the hosts table 511 keeps track of a list of hosts 120, 130 that can be used to spawn the containers. The jobs table 512 keeps track of the status of load jobs 102 and the containers associated with each of the load jobs 102. The containers table 513 keeps track of the containers being used per host per load job. For example, in an illustration containers 121, 123, 125 are used by host 120 for load job 102. However, the load job 102 could use additional hosts and containers. For example, the load job 102 could use both hosts 120 and 130 with their associated containers. In another example, one load job may use host 120 with its containers and another load job could use host 130 with its containers.

Load Test User Interface

Figure 6A:
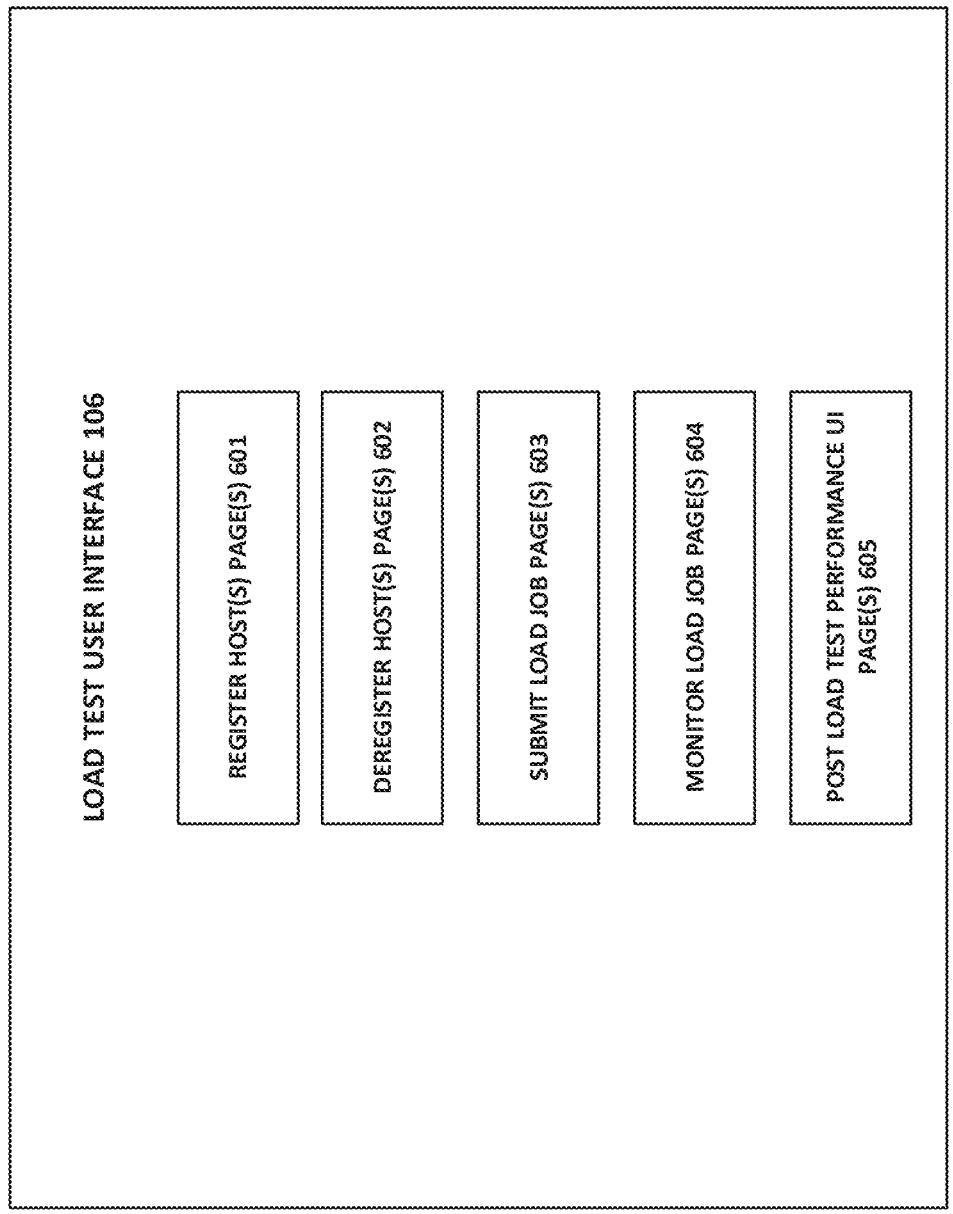
FIG. 6A depicts a block diagram of the load test user interface, according to one embodiment.

FIG. 6A depicts a block diagram of the load test user interface, according to one embodiment. The load test user interface 106 (FIG. 1) includes pages 601-605 (FIG. 6A) for registering host(s), deregistering host(s), submitting a load job, monitoring a load job, and viewing post load test performance information. Dashboards may be used for viewing the post load test performance information. The post load test performance information can be in logs and page(s) can be used to download those logs. The page(s) 605 can use graphs or charts to view the post load test performance information. The graphs and/or charts may be any type of graph or chart that is well known in the art, such as include line graphs, bar graphs, Venn diagrams, column histograms, scatter charts, and so on.

According to one embodiment, referring to FIGS. 1, 5A and 6, the load test user interfaced 106 is built in AngularJS™ and uses the backend application 107's REST APIs 108. For example, the REST APIs 108 are called by respective pages 601-605. More specifically, REST API 501 is called by page 601, REST API 502 is called by page 602, and REST API 503 is called by page 603 and so on.

Figure 6B:
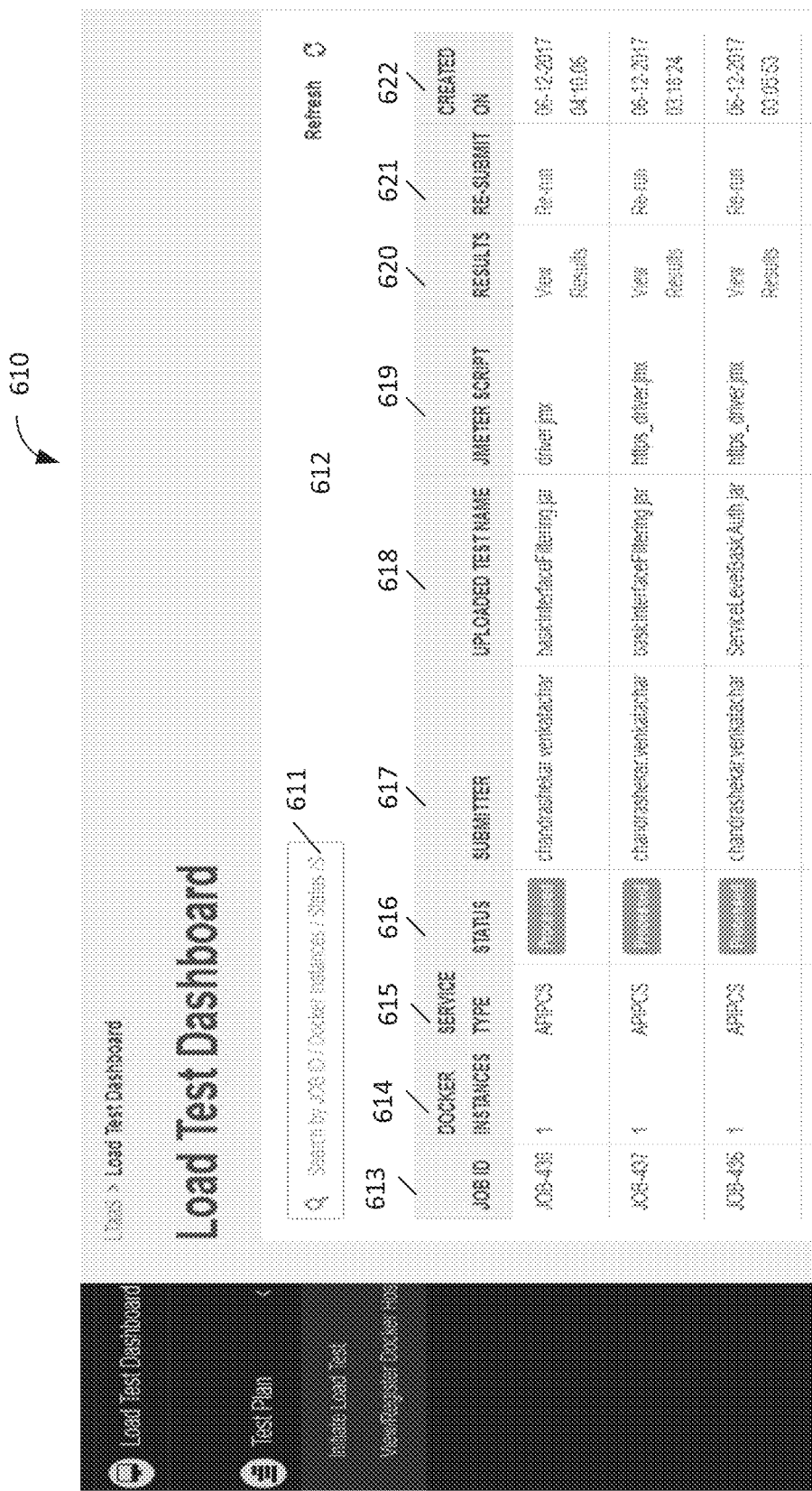
FIG. 6B depicts a screen shot of a page for the load test user interface, according to one embodiment.
Figure 6C:
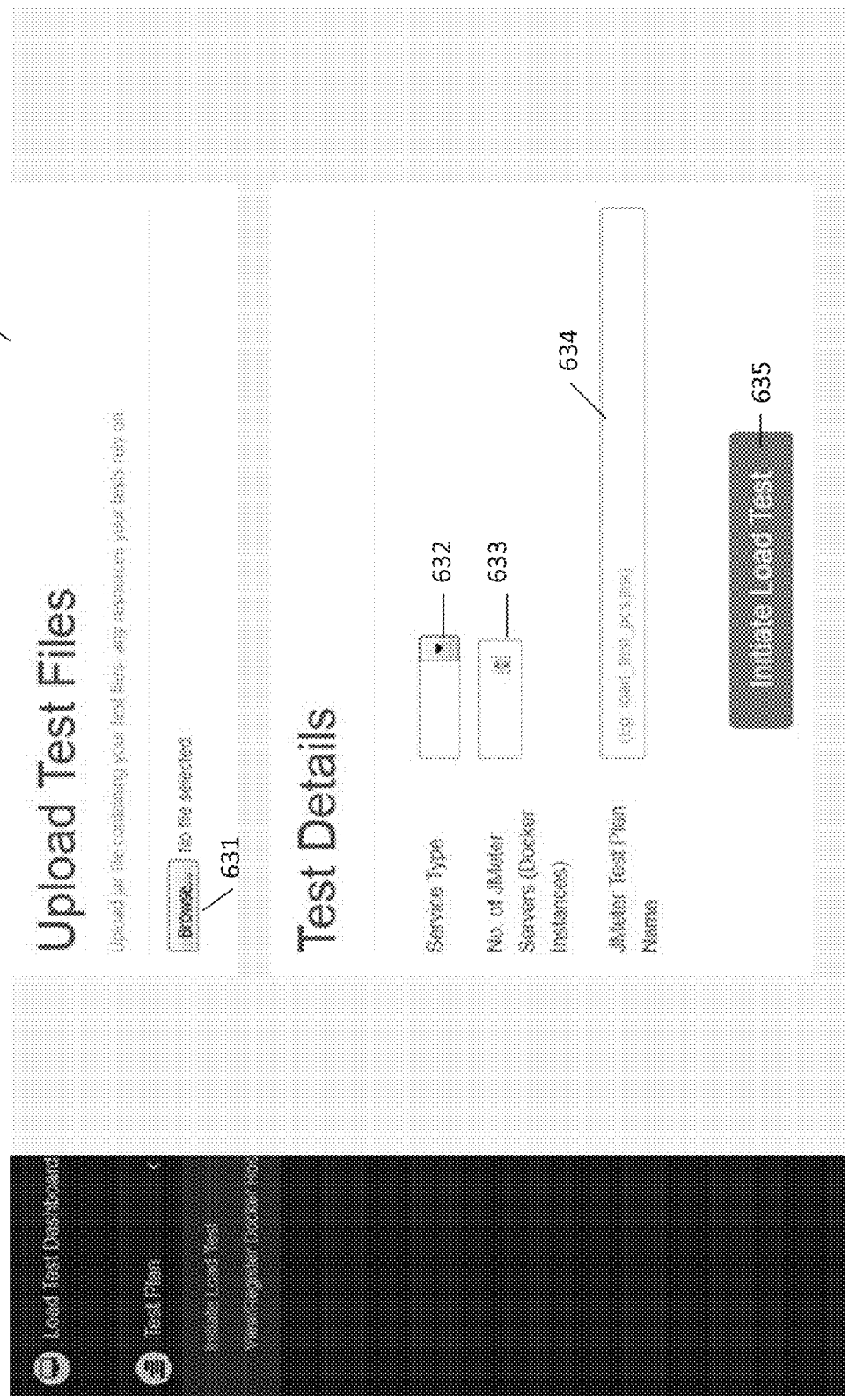
FIG. 6C depicts a screen shot of a page for the load test user interface, according to one embodiment.
Figure 6D:
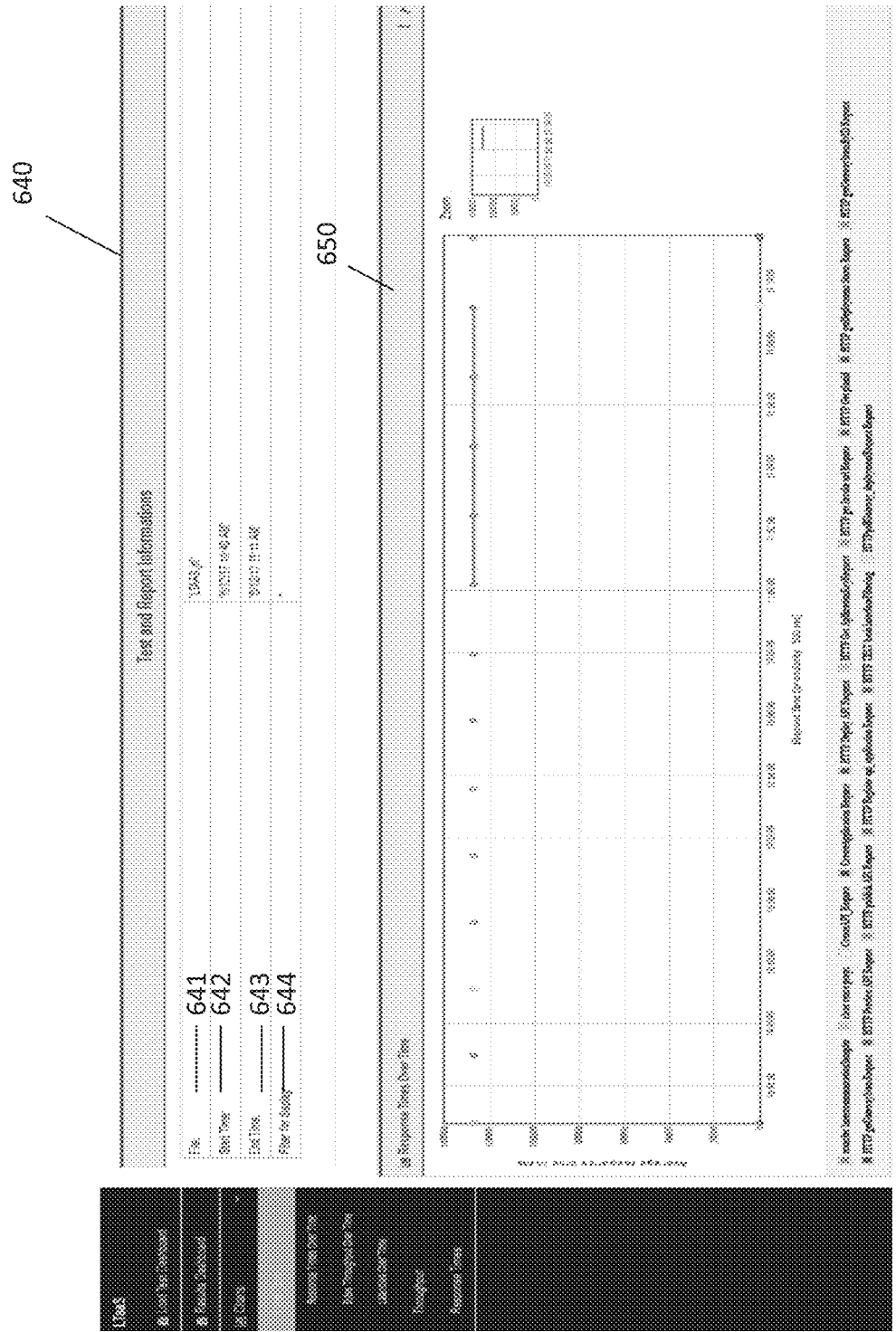
FIG. 6D depicts a screen shot of a page for the load test user interface, according to one embodiment.

FIGS. 6B-6D depict screen shots of pages for the load test user interface, according to one embodiment.

FIG. 6B depicts a screen shot 610 of a page for the submit load job(s) pages 603. The page in screen shot 610 includes a data entry field 611 for providing a job ID, container instance or status to search for. The page also depicts a table 620 with columns for job identifier (ID) 613, docker instance 614, service type 615, status 616 of the load job, submitter 617 of the load job, name of the uploaded test name 618, name 619 of the script 310, whether results are provided 620, re-submit status 621, and date 622 that the load job was created.

FIG. 6C depicts a screen shot 630 of a page for the submit load job(s) pages 603. The page in screen shot 630 depicts a browse button 631 for browsing uploaded jar files containing test files and resources that the tests relied on. The page also depicts a drop down user select option 632 for selecting a service type, another user selection option 633 for specifying the number of servers 124, 126, 134, 136 for a hardware host, and a third user selection option 634 for specifying the name of a test plan. The page in screen shot 630 also depicts an initiate load test button 635 for initiating the load test.

FIG. 6D depicts a screen shot 640 of a page for the post load test performance UI page(s) 605. The screen shot 605 depicts a file name 641 for the load test, a start time 642 of the load test, an end time 643 of the load test, and a filter name 644. The screen shot 640 depicts a table 650 of response times over time for the load test.

Real Time Performance Info Database and Real Time User Interface

Referring to FIGS. 1 and 3, the scripts 310 will be configured to provide real time metrics such as response times of the servers 124, 126 into real time performance information database 113, for example, using the Graphite™ protocol. According to one embodiment, the real time user interface 114 provides Grafana™ real time dashboards and the database 113 is an InfluxDB™. The real time user interface 114 can provided for viewing real time metrics of the load 117 by configuring the database 113 in Graphana™ Examples of real time metrics include CPU usage, I/O usage, and network metrics, among others. Examples of real time dashboards include line graphs, bar graphs, Venn diagrams, column histograms, scatter charts, and so on. The real time dashboards may be any type of graph or chart that is well known in the art.

Exemplary Methods

FIG. 7 depicts a flowchart 700 for a method of automatically performing a load test on an application, according to one embodiment.

In preparation for the method flowchart 700, referring to FIGS. 1, 3 and 6, a user can interact with the register host(s) page(s) 601 to register one or more hosts 120 and 130 with the system 100. The user can interact with the submit load job page 603 to submit the build job 101 that includes the task submit job 301. The build job 101 is submitted. A build job 101 completes in a Jenkins based CI system 100 and the application 110 is then started. The perfmon agent 111 is configured to run on the server 140 running the application 110.

The property file 320 specifies the number of servers to create on respective hosts. The details of the application 110, such as the application's uniform resource locator (URL), are passed in through the property file 320.

At 710, the method begins.

At 720, a request is received for executing the load test on the application. The request includes a script and a property file. Referring to FIG. 2, the load job 102 is an example of a request that includes a script 310 and a property file 320.

Referring to FIGS. 1, 3, and 5A, 5B, the task submit job 301 is part of the build job 101. FIG. 4 depicts pseudocode 400 with instructions 401-404 of the task submit job 301. At instruction 401, the Maven™ coordinates of the plugin 104 are provided. At instruction 402, the task submit job 301 initializes the jarfilename 411 with the name of the JAR file 302 and the jmxfilename 412 with the name of the script 310. The location of the jobidfile is passed to the plugin 104 by the build job 101. At instruction 403, the values of the prop data structure 410 are transferred to the ITaaSPostJob data structure 420, which is a consumable object. At instruction 404, the task submit job 301 calls the plugin API 103 passing the consumable object 420. Data structure 420 provides instructions for the backend application 107's REST APIs 108 on how to perform the automatic load test on the application 110. The build job 101 uses CI-LTaaS Gradle Plugin Submit Job API 103 to submit a new load Job. This API 103 calls the CI-LTaaS Backend submit job REST API 503 which creates a new job entry in MongoDB™ 109 jobs table 512 and returns a job identifier (ID) to the build job 101. The job identifier is received when load job is submitted. The build job 101 then uses monitor API to monitor the load job with the job identifier. Then fetches results for the job with the job identifier.

Referring to FIGS. 1 and 4, the plugin 104 communicates the consumable object 420 to the backend application 107's REST APIs 108. One or more of the backend application 107's REST APIs 108 communicate with one or more REST APIs 127, 137 in the respective hosts 120, 130. The REST APIs 127, 137 communicate with the respective daemons 128, 138.

At 730, containers are created on a hardware host, and at 740, a client and a plurality of servers are created in the containers.

The load job 102 includes the information specifying the hardware host 120, 130 and number of servers 124, 126, 134, 136 to create on each of the hardware hosts 120, 130. For example, two servers are created on hardware host 120 and two servers are created on hardware host 130. Further, the client and the plurality of servers are created in the containers based on the information specifying the number of servers to spawn on each of the hardware hosts.

Referring to FIG. 1, the cron job 116 picks up the new load job 102 and uses the daemons 128, 138 and their respective REST APIs 127, 137 to spawn the requested JMeter™ client and server docker containers 121, 123, 125 and their associated clients 122, 132 and servers 124, 126, 134, 136 onto one or more selected hosts 120, 130. When a container is spawned, the container identifier is returned to the calling an API for the backend application 107. This data that specifies the container identifier and the name of the hardware host is persisted in the database 109 against the job identifier.

As discussed herein, each of the containers isolate mutually exclusive subsets of hardware resources of the hardware host based on namespaces. There is a one to one correspondence between clients/servers and a container. Each container contains only one client or server and each namespace is associated with only one container. The client and the servers are designated to communicate with the application.

According to one embodiment, the clients 122, 132 are JMeter™ clients that are instances of a docker client image and the servers 124, 126, 134, 136 are JMeter™ servers that are instances of a docker server image.

According to one embodiment, each of the docker client images and docker server images include a base operating system, such as Linux. According to one embodiment, the base operating system is a striped down operating system that can be obtained by the service that provides the images. According to one embodiment, the images are obtained from a Docker™ repository. The operating system is a real operating system that the clients and the servers obtain assistance from without intervention of any virtual machines. The phrase "real operating system" means an operating system that provides services with respect to the hardware of a host instead of emulating hardware. Virtual machines and virtual operating systems that emulate hardware are well known in the art.

Referring to FIGS. 1, 3 and 5B, the cron job 116 updates the job status in the MongoDB™ 109 jobs table 512 to "In Progress" status. The list of IPs of the server containers 123, 125 are passed to the associated client 122. Also a jar file 302 containing the JMeter™ Java™ Management Extension (JMX) files containing the script 310 and related property file(s) 320 and artifacts 330 are also passed to the JMeter™ client 122. The JMeter™ client 122 passes on the JMeter™ artifacts 330 to listed servers 124, 126 passed to the client 122.

At 750, the load test is performed on the application while each of the client and the servers use a subset of the hardware resources isolated by a respective namespace.

The property file 320 (FIG. 3) is input to the script 310 (FIG. 3) and the script 310 instructs the client 122 (FIG. 1) on how to control execution of the load test 117 (FIG. 1) by the servers 124, 126 (FIG. 1).

Still referring to FIG. 1, the client and server containers 121, 123, 125 execute the JMeter™ load 117. The client and server containers 121, 123, 125 are configured to interact using remote method invocation (RMI) protocol on a standard port 141 on the docker( )network 112.

During the course of the load 117, the JMeter™ client 122 collects the CPU, I/O, network etc. characteristics of the servers 124, 126 from the perfmon agent 111. The JMeter™ client 122 also keeps posting the load metrics to real time performance information database 113. One can view real time load profile in the real time user interface 114 while the load 117 is performed on the application 110.

At 760, remove the containers, the client and the servers from the hardware host after the load test has completed.

For example, referring to FIGS. 1 and 5A, the build job 101 uses monitor load job API 504 to monitor the status of the load job 102. The API 103 continuously polls the backend application 107 using the monitor REST API 504 and returns when the load job 102 proceeds to a completed status.

The backend cron job 116 keeps checking if the client container 121 exited to determine if the load 117 has completed. The cron job 116 then gathers requested results JTL file from client container 121 and the log files from the client and server containers 121, 123, 125. A JTL file is a JMeter™ created text file. The cron job 116 uses the command line tool 115 to generate standard charts for the load 117 after the load job 102 has completed. The results JTL file and the log files are examples of post load test performance information.

Referring to FIGS. 1 and 5A, the build job 101 uses obtain results API 505 to fetch the result JTL file from the backend application 107 and generate any requested custom charts. Using plugin 103, the build script 102 can fetch the JTL file and generate custom charts. And those results can be embedded in a proprietary dashboards that the organization provides.

Referring to FIGS. 1 and 6, a user can use the monitor load job page 604 to cause performance information to be monitored, for example, by the perfmon agent 111. The post load test performance information can be viewed via the pages 605.

After the post load test performance information has been collected and stored, the containers 121, 123, 125, 131, 133, 135 can be removed after the load job 102 completes, thus, ensuring that any subsequent load job will start in a clean state.

The containers and their associated clients or servers are created before each load test and removed after each load test completes, thus, enabling each load test to be performed from a clean state. For example, the cron job 116 uses the list of container identifiers that were stored in the database 109 during the build for a host 120, 130 for that job and pass the container identifiers onto the daemon 128, 138 on the host 120, 130. The daemon 128, 138 uses the container identifiers to identify which containers to remove. Respective daemons 128, 138 remove containers from the hardware hosts 120, 130 they are associated with. The backend application 107 calls the docker REST API exposed by the daemon to remove whatever containers are on a hardware host.

At 770, the method ends.

Thus, referring to FIG. 1, various embodiments provide an approach to use docker containers with Distributed JMeter™ setups in the docker images to execute load tests. This approach ensures that the containers always start from a clean state for each load execution. Further using the distributed JMeter™ enables scaling the load with execution of many concurrent containers. According to one embodiment, the CI-LTaaS system 100 is a NodeJS® based application which manages job submission, job execution and generating reports from the final JMeter™ results. The system 100 leverages docker daemon based REST APIs 127, 137 to control spinning up of docker instances, in the form of the clients 122, 132, and servers 124, 126, 134, 136, handing over load jobs 102 to the docker containers 121, 123, 125, 131, 133, 135 and finally destroying the containers. Also it uses dockerode node packages to execute the docker REST APIs 127, 137.

The CI-LTaaS system 100 is a centralized system for managing JMeter™ based load jobs 102. This enables quick, repeated and continuous mini-stress load tests to be executed by various testing organizations without the need for a large infrastructure setup so that it can be determined that the application 110 can withstand basic loads before the builds are promoted to long-running heavy load tests.

In contrast, using VMs would require that the automation system have access to the hypervisors. In contrast, docker containers can run anywhere, even on a VM. Further, any changes to an image that results in a client or server is easier to perform with Docker™. In the case of VMs, one has to re-create the snapshots of the clients and the servers, with the relevant changes which is more complex than updating a docker image. In contrast to using a VM approach, multiple docker containers 121, 123, 125, 131, 133, 135 can be spawned on the same host 120, 130 and they all can listen on the same port 141 since they all have separate IPs 201-204 (FIG. 2) on the "docker0" bridge network 112. In essence you can spawn multiple JMeter™ servers on the same host, using Docker™ methodology thus maximizing CPU and memory usage on the host by JMeter™ Servers 124, 126, 134, and 136 running inside docker containers 123, 125, 133, 135.

Therefore, it is more economical to setup load infrastructure, especially for mini load tests, using docker containers instead of VMs.

Starting multiple docker containers even on the same host happens in a matter of seconds especially with small images for the clients and servers with little more than JMeter™ installation in each, as discussed herein. On the other hand, spawning the VMs instead of the docker containers would take several minutes. Quick easy setup, management and cleanup is well suited for quickly and continuously executing mini load tests one after another. For each build of an application, a small load could be executed to determine whether the performance of an application had not regressed due to changes made to the application. These load test executions may be planned in the order of 15 mins to 30 mins duration and would be run for every build of an application. Given that they would be short runs being kicked off with high frequency (since there would be several builds in an hour based on the number of developer check-ins to the system 100), start up times would matter in the kind of paradigm that is used of this system 100.

Multiple load test runs can be spawned on the same host since many docker containers can be spawned on a host. This also ensures optimal hardware infrastructure usage. In contrast, only one JMeter™ server can be created per VM.

In the case of VMs, the VM snapshot will always have to be restored for each run, to start from a clean state. Thus, the VM boot would always have to be a full boot and there is no way to save on startup time since one cannot use warm/cold starts of the VM.

According to one embodiment, a Gradle based plugin 104 is provided for submitting automated load jobs 102 to our centralized CI system 100.

Real time load monitoring is provided using Graphana Dashboards™ of the real time UI 114. System 100 provides JMeter™ perfmon plugin 111 based reports for server CPU, I/O, Network metrics, among others, which can be used for debugging if a load job 102 performed against an application 110 using the system 100 reveals any performance degradation between builds of the application 110.

There are some products that provide proprietary ways of modelling the loads. Further, they may provide for converting JMeter™ scripts into their proprietary forms. However, these proprietary ways of modeling the load tests are limited to using only http/https protocols between the servers 124, 126, 134, 136 and an application 110 and do not support the full breadth of features that JMeter™ supports, such as FTP, TCP, LDAP, JDBC etc. protocols between the servers 124, 126, 134, 136 and an application 110. Since the servers 124, 126, 134, 136 are JMeter™ servers, according to one embodiment, the full breadth of features that JMeter™ supports is available for the communications between the servers and the one or more applications that is being load tested.

An embodiment provides for receiving a second request to execute a second load test on the application; and in response to the second request, performing the second load test on the application by executing a second client and a second set of servers that communicate with the application while each of the second client and the second set of servers is contained in a second set of containers, wherein only one of the second client or the second set of servers is contained in each of the second set of containers; and removing the second set of containers and associated client and servers from the hardware host after the second load test has completed. For example, referring to FIG. 1, after the load 117 completes for the load job 102, a second request in the form of another load job can be received that executes a second load test and so on. Thus, various embodiments provide for a continuous integration LTaaS system 100 that quickly and continuously executes load tests in succession.

An embodiment provides for wherein the client is an industry standard client and the servers are industry standard servers. For example, referring to FIG. 1, the client 122, 132 is an industry standard client and the servers 124, 126, 134, 136 are industry standard servers. An embodiments provides for wherein the industry standard client is a JMeter™ client and the industry standard servers are JMeter™ servers. An embodiment provides for wherein the client is a JMeter™ client and the servers are JMeter™ servers.

An embodiments provides for wherein the client is an instance of a docker client image and the server is an instance of a docker server image. An embodiment provides for wherein each of the docker client image and the docker server image includes an operating system. An example of an operating system that the docker images can include is Linux, as discussed herein.

An embodiment provides for wherein each of the containers is a different docker container. For example, referring to FIG. 1, the containers 121, 123, 125, 131, 133, 135, according to one embodiment, is a docker container.

An embodiments provides for providing real time performance information while the load test is being performed on the application. For example, referring to FIG. 1, real time performance information can be gathered in the database 113 and provided to a user as the load 117 is being performed on the application 110, as discussed herein.

An embodiment provides for providing post load test performance information after the load test has completed. For example, referring to FIG. 1, post load test performance information can be gathered from a client 122, 132 using the cron job 116, as discussed herein, and provided to a user after the load 117 has finished executing on the application 110, as discussed herein. The post load test performance information can be viewed via the pages 605.

An embodiment provides for wherein the containers are not virtual machines. For example, referring to FIG. 1, the containers 121, 123, 125, 131, 133, 135 are docker containers that each associated with a different namespace that isolates mutually exclusive subsets of hardware resources of the hardware host. The containers are not virtual machines. The clients and servers are not included in virtual machines directly or indirectly.

An embodiments provides for wherein each of the client and the servers have an internet protocol address for communicating with the application. For example, each of the clients and servers have an internet protocol address as depicted in FIGS. 2A and 2B. Each of the clients and servers have their own internet protocol address so that none of them are sharing internet protocol addresses.

An embodiments provides for wherein the client and the servers communicate with a port of the application. For example, the clients and servers providing a load for an application all communicate with the same port on the application as depicted in FIGS. 2A and 2B.

An embodiment provides for wherein the client controls the servers. For example, referring to FIGS. 1 and 3, the client receives the tests specified in the load job 102 and instructs the servers to execute according to the tests against the application 110. The tests are defined by the script 310 and the artifacts 330, among other things specified in the JAR file 302.

An embodiment provides for wherein the load test is modeled using industry standardized load modeling without conversion from a proprietary model. For example, the docker containers are used with distributed JMeter™ setup in the docker images, thus, providing non-proprietary industry standardized modeling of the load test. No conversion is performed from JMeter™ to a proprietary model or vice versa.

An embodiment provides for selecting the host from a pool of hosts in a centralized system in response to the receiving of the request. An example of a pool of hosts is a pool of hosts that includes hosts 120 and 130 (FIG. 1), among others. An example of a centralized system is system 100 (FIG. 1).

An embodiment provides for performing a second load test without booting the hardware host or reloading an operating system that resides on the hardware host. For example, FIG. 1 depicts one load test 117 that results from one load job 102 using, for example, host 120. A subsequent load test from a subsequent load job can be performed on the same host 120 without booting the hardware host 120 or reloading an operating system that resides on the hardware host 120.

An embodiment provides for wherein the request is associated with a script that specifies operations the servers are to execute against the application, sequence for executing the operations, how many times to execute the operations, and how many parallel threads to execute against the application. An example of a request is a load job 102 (FIGS. 1 and 3) and an example of a script is script 310 (FIG. 3).

An embodiment provides for wherein the request includes one or more logins, one or more usernames, and one or more passwords for communicating with and accessing the application as part of the load test. For example, referring to FIGS. 1 and 3, a request, such as a load job 102, can include one or more logins 331, one or more usernames 332, and one or more passwords 333 for communicating with and/or accessing the application 110 as part of the load 117.

Example Computer Environment

Figure 8:
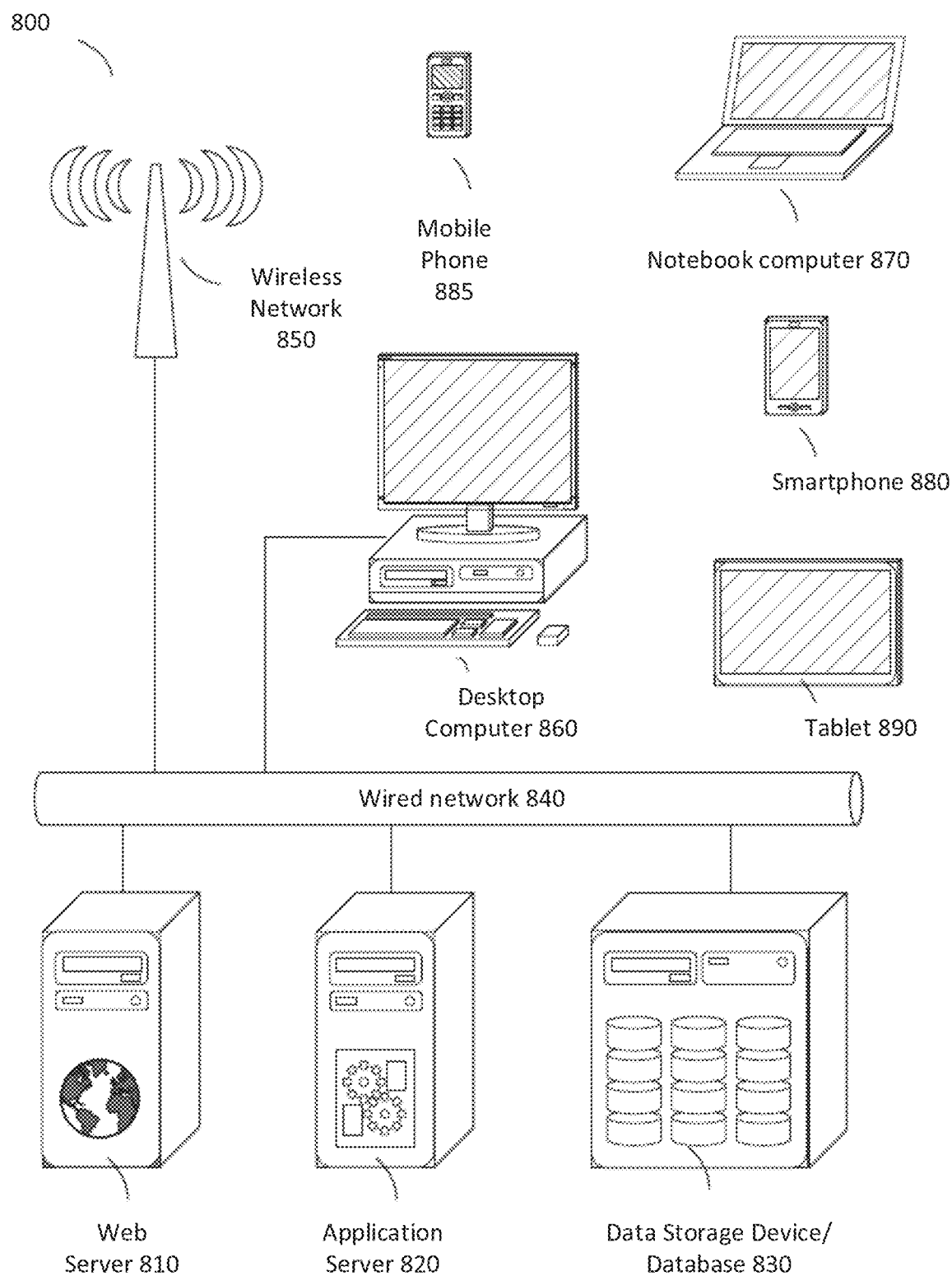
FIG. 8 is a general block diagram of a system and accompanying computing environment usable to implement the embodiments of FIGS. 1-7.

FIG. 8 is a general block diagram of a system 800 and accompanying computing environment usable to implement the embodiments of FIGS. 1-7. The example system 800 is capable of supporting or running various hardware and/or software modules and associated methods discussed with reference to FIGS. 1-7. Note that certain embodiments may be implemented using one or more standalone applications (for example, residing in a user device) and/or one or more web-based applications implemented using a combination of client-side and server-side code.

The general system 800 includes user devices 860-890, including desktop computers 860, notebook computers 870, smartphones 880, mobile phones 885, and tablets 890. The general system 800 can interface with any type of user device, such as a thin-client computer, Internet-enabled mobile telephone, mobile Internet access device, tablet, electronic book, or personal digital assistant, capable of displaying and navigating web pages or other types of electronic documents and UIs, and/or executing applications. Although the system 800 is shown with five user devices, any number of user devices can be supported.

A web server 810 is used to process requests from web browsers and standalone applications for web pages, electronic documents, enterprise data or other content, and other data from the user computers. The web server 810 may also provide push data or syndicated content, such as RSS feeds, of data related to enterprise operations.

An application server 820 operates one or more applications. The applications can be implemented as one or more scripts or programs written in any programming language, such as Java, C, C++, C #, or any scripting language, such as JavaScript or ECMAScript (European Computer Manufacturers Association Script), Perl, PHP (Hypertext Preprocessor), Python, Ruby, or TCL (Tool Command Language). Applications can be built using libraries or application frameworks, such as Rails, Enterprise JavaBeans, or .NET. Web content can created using HTML (HyperText Markup Language), CSS (Cascading Style Sheets), and other web technology, including templating languages and parsers.

The data applications running on the application server 820 are adapted to process input data and user computer requests and can store or retrieve data from data storage device or database 830. Database 830 stores data created and used by the data applications. In an embodiment, the database 830 includes a relational database that is adapted to store, update, and retrieve data in response to SQL format commands or other database query languages. Other embodiments may use unstructured data storage architectures and NoSQL (Not Only SQL) databases.

In an embodiment, the application server 820 includes one or more general-purpose computers capable of executing programs or scripts. In an embodiment, web server 810 is implemented as an application running on the one or more general-purpose computers. The web server 810 and application server 820 may be combined and executed on the same computers.

An electronic communication network 840-850 enables communication between user computers 860-890, web server 810, application server 820, and database 830. In an embodiment, networks 840-850 may further include any form of electrical or optical communication devices, including wired network 840 and wireless network 850. Networks

840-850 may also incorporate one or more local-area networks, such as an Ethernet network, wide-area networks, such as the Internet; cellular carrier data networks; and virtual networks, such as a virtual private network.

The system 800 is one example for executing applications according to an embodiment of the invention. In another embodiment, web server 810, application server 820, and optionally database 830 can be combined into a single server computer application and system. In a further embodiment, virtualization and virtual machine applications may be used to implement one or more of the web server 810, application server 820, and database 830.

In still further embodiments, all or a portion of the web and application serving functions may be integrated into an application running on each of the user computers. For example, a JavaScript application on the user computer may be used to retrieve or analyze data and display portions of the applications.

With reference to FIGS. 1-7, a build job 101 may be received from a client computing device, such as a desktop computer 860, notebook computer 870, smartphone 880, mobile phone 885, tablet 890, of FIG. 8 and/or other computing devices. In a particular example embodiment, the user computing devices 860-890 run browsers, e.g., used to display the user interfaces. User interfaces 106 and 114 may be viewed from a client computing device, such as a desktop computer 860, notebook computer 870, smartphone 880, mobile phone 885, tablet 890, of FIG. 8 and/or other computing devices.

In a particular example embodiment, browsers of the desktop computer 860, notebook computer 870, smartphone 880, mobile phone 885, tablet 890 of FIG. 8 connect to the Internet, represented by the wired network 840 and/or wireless network 850 as shown in FIG. 8, to access one or more network-coupled servers, databases, and/or associated cloud-based functionality, as represented by the modules of FIG. 1. For example, one or more of the web server 810 shown in FIG. 8 may be used to host software corresponding to the modules for 104, 103, 105, 107, 121-128, 131-138, 114 of FIGS. 1 and 2, as detailed more fully below. Note that one or more application servers 820 may be used to host an application such as application 110 (FIG. 1) and/or application 230 (FIG. 2B). One or more databases 830 as shown in FIG. 8 may be used to host a database, such as database 109 and/or 113.

Figure 9:
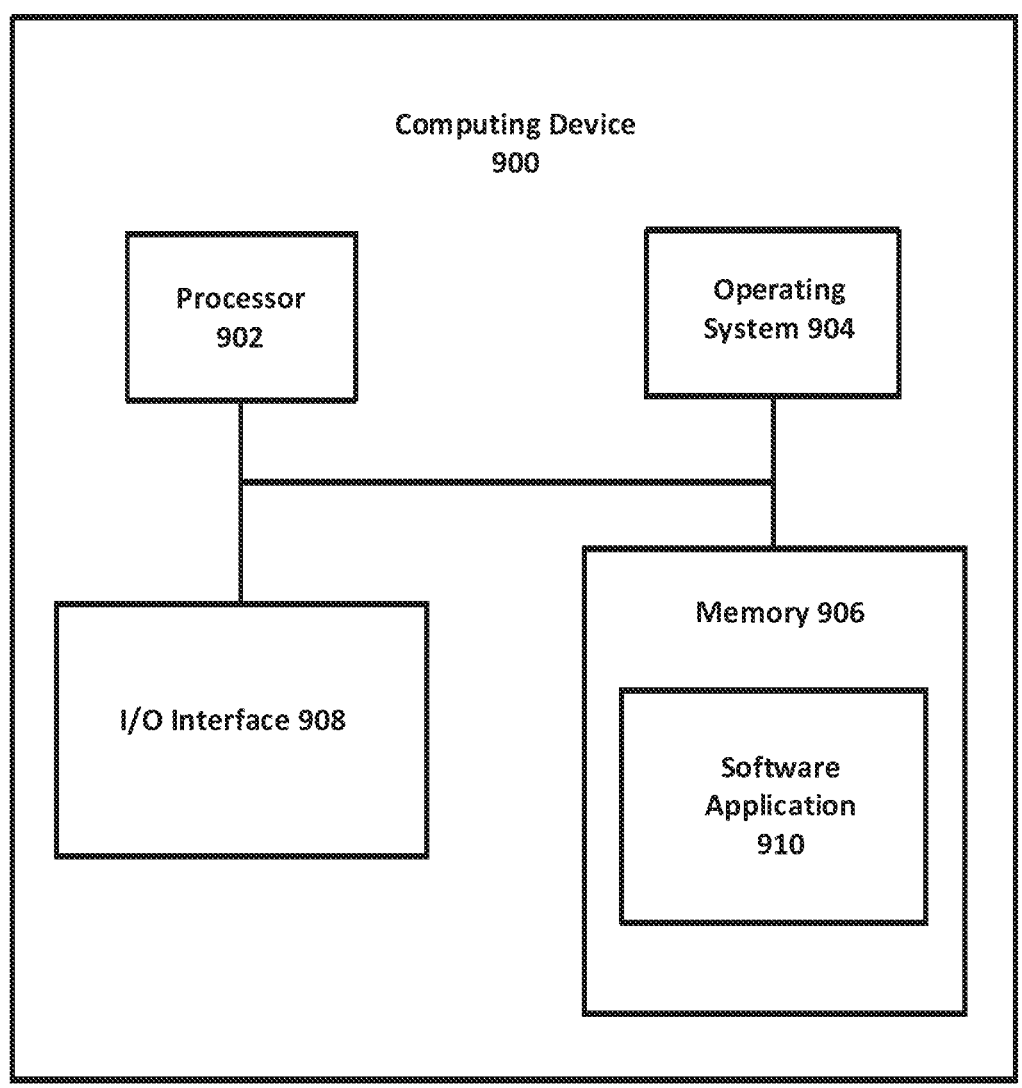
FIG. 9 is a general block diagram of a computing device usable to implement the embodiments described herein.

FIG. 9 is a general block diagram of a computing device 900 usable to implement the embodiments described herein. While the computing device 900 of FIG. 9 may be described as performing one or more of the steps in the embodiments herein, in other embodiments any suitable component or combination of components of the computing device 900 or any suitable processor or processors associated with system 900 may facilitate performing the steps.

FIG. 9 illustrates a block diagram of an example computing system 900, which may be used for implementations described herein. For example, computing system 900 may be used to implement user devices 860-890, and server devices 810, 820 of FIG. 8 as well as to perform the method implementations described herein. In some implementations, computing system 900 may include a processor 902, an operating system 904, a memory 906, and an input/output (I/O) interface 908. In various implementations, processor 902 may be used to implement various functions and features described herein, as well as to perform the method implementations described herein. While processor 902 is described as performing implementations described herein, any suitable component or combination of components of system 900 or any suitable processor or processors associated with system 900 or any suitable system may perform the steps described. Implementations described herein may be carried out on a user device, on a server, or a combination of both.

Computing device 900 also includes a software application 910, which may be stored on memory 906 or on any other suitable storage location or computer-readable medium. Software application 910 provides instructions that enable processor 902 to perform the functions described herein and other functions. The components of computing system 900 may be implemented by one or more processors or any combination of hardware devices, as well as any combination of hardware, software, firmware, etc.

For ease of illustration, FIG. 9 shows one block for each of processor 902, operating system 904, memory 906, I/O interface 908, and software application 910. These blocks 902, 904, 906, 908, and 910 may represent multiple processors, operating systems, memories, I/O interfaces, and software applications. In various implementations, computing system 900 may not have all of the components shown and/or may have other elements including other types of components instead of, or in addition to, those shown herein.

Hardware hosts 120 and 130 are hardware computing devices 900, according to one embodiment.

A Computer Readable Medium and an Apparatus

Unless otherwise specified, any one or more of the embodiments described herein can be implemented using processor readable instructions which reside, for example, in tangible processor-readable storage device of a computer system or like device. The tangible processor-readable storage device can be any kind of physical memory that instructions can be stored on. Examples of the tangible processor-readable storage device include but are not limited to a disk, a compact disk (CD), a digital versatile device (DVD), read only memory (ROM), flash, and so on. As described above, certain processes and operations of various embodiments of the present invention are realized, in one embodiment, as a series of processor readable instructions (e.g., software program) that reside within tangible processor-readable storage device of a computer system and are executed by one or more processors of the computer system. When executed, the instructions cause a computer system to implement the functionality of various embodiments of the present invention. For example, the instructions can be executed by a processor. The processor is a hardware processor, such as a central processing unit, associated with the computer system. The tangible processor-readable storage device is hardware memory and the one or more processors are hardware processors.

Various embodiments provide for a tangible processor-readable storage device including instructions for a method of performing a load test on an application, wherein the tangible processor-readable storage device includes instructions executable by one or more processors for: performing a load test on an application, wherein the tangible processor-readable storage device includes instructions executable by one or more processors for: receiving a request for executing the load test on the application, wherein the request includes a script and a property file, includes information specifying a number of hardware hosts, information specifying a number of servers to spawn, information specifying which of the hardware hosts to create the servers for the load test; and in response to the request, creating containers on a hardware host based on the information specifying the hardware host and the information specifying number of servers to spawn, wherein each of the containers isolate mutually exclusive subsets of hardware resources of the hardware host based on namespaces; creating a client and a plurality of servers in the containers based on the information specifying the number of servers to spawn, wherein only one of the client or the servers reside in each of the containers, wherein the client and the servers are designated to communicate with the application; performing the load test on the application while each of the client and the servers use the subset of the hardware resources isolated by a respective namespace, wherein the property file is input to the script and the script instructs the client on how to control execution of the load test by the servers; and removing the containers, the client and the servers from the hardware host after the load test has completed, wherein containers with associated client and servers are created and removed each time a load test is performed.

Further, various embodiments provide an apparatus comprising: one or more processors; and a tangible processor-readable storage device including instructions for: receiving a request for executing a load test on an application, wherein the request includes a script and a property file, includes information specifying a number of hardware hosts, information specifying a number of servers to spawn, information specifying which of the hardware hosts to create the servers for the load test; and in response to the request, creating containers on a hardware host based on the information specifying the hardware host and the information specifying number of servers to spawn, wherein each of the containers isolate mutually exclusive subsets of hardware resources of the hardware host based on namespaces; creating a client and a plurality of servers in the containers based on the information specifying the number of servers to spawn, wherein only one of the client or the servers reside in each of the containers, wherein the client and the servers are designated to communicate with the application; performing the load test on the application while each of the client and the servers use a subset of the hardware resources isolated by a respective namespace, wherein the property file is input to the script and the script instructs the client on how to control execution of the load test by the servers; and removing the containers, the client and the servers from the hardware host after the load test has completed, wherein containers with associated client and servers are created and removed each time a load test is performed Conclusion Although the description has been described with respect to particular embodiments thereof, these particular embodiments are merely illustrative, and not restrictive. For example, the features and operations could be arranged differently. Alternative services or products may be used. For example, other types of load testing functions besides JMeter™ can be used. Further, other types of containers besides Docker™ can be used. Other types of interfaces besides REST APIs may be used.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A non-transitory processor-readable storage device including instructions for a method of overlapping-in-time execution of load tests on applications in a centralized system, wherein the non-transitory processor-readable storage device includes instructions executable by one or more processors for:

receiving user specified build jobs at the centralized system, wherein each of the build jobs includes a respective one of load jobs for the applications to execute in the centralized system;

selecting hardware hosts from a hardware hosts pool associated with the centralized system;

creating clients and servers on the selected hardware hosts based on the build jobs, wherein each of the selected hardware hosts includes one of the clients and a subset of the servers, wherein each of the clients and each of the servers resides in a separate container of a plurality of containers, wherein each of the clients and each of the servers use mutually exclusive subsets of hardware resources provided by the containers and obtain non-emulated operating system assistance from non-emulated operating systems residing on the selected hardware hosts;

starting execution of the applications and the load jobs;

executing the load tests on the applications by creating communications between the servers and the clients based on the load jobs, wherein the executing of the load tests overlap-in-time;

collecting real time performance information during the executing of the load tests of the applications; and after completion of a subset of the load tests, making a subset of the selected hardware hosts available for executing subsequent load tests by removing containers with respective clients and servers that reside on the subset of the selected hardware hosts.

2. The non-transitory processor-readable storage device of claim 1, wherein the method further includes:

making the subset of selected hardware hosts available for subsequent load tests without rebooting any of the selected hardware hosts and without reloading any of corresponding ones of the non-emulated operating systems residing on the selected hardware hosts.

3. The non-transitory processor-readable storage device of claim 1, wherein the method further includes:

designating each of the clients and each of the subsets of servers for communicating with a separate one of the applications.

4. The non-transitory processor-readable storage device of claim 1, wherein the method further includes:

providing a separate internet protocol address to each of the servers for communicating with corresponding ones of the applications.

5. The non-transitory processor-readable storage device of claim 1, wherein the method further includes:

configuring daemons on each of the hardware hosts in the hardware hosts pool; and managing respective lifecycles of each of the containers with Representational State Transfer (REST) Application Program Interfaces (APIs) associated with the daemons.

6. The non-transitory processor-readable storage device of claim 1, wherein the method further includes:

providing a respective task submit job with task submit job instructions in each of the build jobs, wherein the task submit job instructions are for: providing coordinates to a plugin, reading properties in a properties dataset, setting properties into an object consumed by a plugin Application Program Interfaces (API), and calling the plugin API.

7. The non-transitory processor-readable storage device of claim 6, wherein the method further includes:

receiving publication of the plugin; and controlling, via the plugin, the executing and monitoring of a particular load job.

8. The non-transitory processor-readable storage device of claim 1, wherein the method further includes:

providing a cron job that checks a job table for submitted load jobs, selects the selected hardware hosts, creates the clients and servers on the selected hardware hosts using REST APIs of daemons preconfigured on each of the hardware hosts in the hardware hosts pool, checks for completion of executing load tests, gathers results and logs from containers, deletes containers, and marks load tests complete.

9. The non-transitory processor-readable storage device of claim 1, wherein the method further includes:

providing a load test user interface with pages for registering the hardware hosts in the hardware hosts pool, deregistering the hardware hosts in the hardware hosts pool, submitting load jobs associated with the build jobs, monitoring the load jobs, and viewing post load test performance information.

10. The non-transitory processor-readable storage device of claim 1, wherein each of the load jobs includes a task submit job and a JAR file, wherein the JAR file includes a script and a property file, and wherein the property file includes one or more logins, one or more user names, and one or more passwords.

11. A method of overlapping-in-time execution of load tests on applications in a centralized system, wherein the method includes:

receiving user specified build jobs at the centralized system, wherein each of the build jobs includes a respective one of load jobs for the applications to execute in the centralized system;

selecting hardware hosts from a hardware hosts pool associated with the centralized system;

creating clients and servers on the selected hardware hosts based on the build jobs, wherein each of the selected hardware hosts includes one of the clients and a subset of the servers, wherein each of the clients and each of the servers resides in a separate container of a plurality of containers, wherein each of the clients and each of the servers use mutually exclusive subsets of hardware resources provided by the containers and obtain non-emulated operating system assistance from non-emulated operating systems residing on the selected hardware hosts;

starting execution of the applications and the load jobs;

executing the load tests on the applications by creating communications between the servers and the clients based on the load jobs, wherein the executing of the load tests overlap-in-time;

collecting real time performance information during the executing of the load tests of the applications; and after completion of a subset of the load tests, making a subset of the selected hardware hosts available for executing subsequent load tests by removing containers with respective clients and servers that reside on the subset of the selected hardware hosts.

12. The method of claim 11, wherein the method further includes:

making the subset of selected hardware hosts available for subsequent load tests without rebooting any of the selected hardware hosts and without reloading any of corresponding ones of the non-emulated operating systems residing on the selected hardware hosts.

13. The method of claim 11, wherein the method further includes:
    designating each of the clients and each of the subsets of servers for communicating with a separate one of the applications.

14. The method of claim 11, wherein the method further includes:
    providing a separate internet protocol address to each of the servers for communicating with corresponding ones of the applications.

15. The method of claim 11, wherein the method further includes:
    configuring daemons on each of the hardware hosts in the hardware hosts pool; and
    managing respective lifecycles of each of the containers with Representational State Transfer (REST) Application Program Interfaces (APIs) associated with the daemons.

16. The method of claim 11, wherein the method further includes:
    providing a respective task submit job with task submit job instructions in each of the build jobs, wherein the task submit job instructions are for: providing coordinates to a plugin, reading properties in a properties dataset, setting properties into an object consumed by a plugin Application Program Interfaces (API), and calling the plugin API.

17. The method of claim 16, wherein the method further includes:
    receiving publication of the plugin; and
    controlling, via the plugin, the executing and monitoring of a particular load job.

18. The method of claim 11, wherein the method further includes:
    providing a cron job that checks a job table for submitted load jobs, selects the selected hardware hosts, creates the clients and servers on the selected hardware hosts using REST APIs of daemons preconfigured on each of the hardware hosts in the hardware hosts pool, checks for completion of executing load tests, gathers results and logs from containers, deletes containers, and marks load tests complete.

19. The method of claim 11, wherein the method further includes:
    providing a load test user interface with pages for registering the hardware hosts in the hardware hosts pool, deregistering the hardware hosts in the hardware hosts pool, submitting load jobs associated with the build jobs, monitoring the load jobs, and viewing post load test performance information.

20. An apparatus for overlapping-in-time execution of load tests on applications in a centralized system, the apparatus comprising:
    one or more processors; and
    a non-transitory processor-readable storage device including instructions for:
    receiving user specified build jobs at the centralized system, wherein each of the build jobs includes a respective one of load jobs for the applications to execute in the centralized system;
    selecting hardware hosts from a hardware hosts pool associated with the centralized system;
    creating clients and servers on the selected hardware hosts based on the build jobs, wherein each of the selected hardware hosts includes one of the clients and a subset of the servers, wherein each of the clients and each of the servers resides in a separate container of a plurality of containers, wherein each of the clients and each of the servers use mutually exclusive subsets of hardware resources provided by the containers and obtain non-emulated operating system assistance from non-emulated operating systems residing on the selected hardware hosts;
    starting execution of the applications and the load jobs;
    executing the load tests on the applications by creating communications between the servers and the clients based on the load jobs, wherein the executing of the load tests overlap-in-time;
    collecting real time performance information during the executing of the load tests of the applications; and
    after completion of a subset of the load tests, making a subset of the selected hardware hosts available for executing subsequent load tests by removing containers with respective clients and servers that reside on the subset of the selected hardware hosts.

* * * * *

UNITED STATES PATENT AND TRADEMARK OFFICE
CERTIFICATE OF CORRECTION

PATENT NO. : 10,963,361 B2  
APPLICATION NO. : 16/564627  
DATED : March 30, 2021  
INVENTOR(S) : Vedurumudi et al.

Page 1 of 1

It is certified that error appears in the above-identified patent and that said Letters Patent is hereby corrected as shown below:

In the Specification

In Column 1, Line 58, delete "performed" and insert -- performed. --, therefor.

In Column 4, Line 64, before "script" delete "a".

In Column 5, Line 22, before "script" delete "a".

In Column 7, Line 32, before "script" delete "a".

In Column 10, Line 3, delete "deregstering" and insert -- deregistering --, therefor.

In Column 12, Line 3, delete "Graphana™" and insert -- Grafana™. --, therefor.

In Column 14, Line 2, delete "docker( )" and insert -- docker0 --, therefor.

In Column 15, Line 66, delete "Graphana" and insert -- Grafana --, therefor.

In Column 21, Line 47, delete "performed" and insert -- performed. --, therefor.

Signed and Sealed this  
Tenth Day of August, 2021

Drew Hirshfeld  
*Performing the Functions and Duties of the*  
*Under Secretary of Commerce for Intellectual Property and*  
*Director of the United States Patent and Trademark Office*